(12) United States Patent
Nawade et al.

(10) Patent No.: US 11,163,315 B2
(45) Date of Patent: Nov. 2, 2021

(54) METHOD AND SYSTEM FOR SYNCHRONIZING MOVEMENT OF TRANSPORT VEHICLES IN A STORAGE FACILITY

(71) Applicant: GREY ORANGE PTE. LTD., Singapore (SG)

(72) Inventors: Kaustubh Nawade, Mumbai (IN); Naveen Boppana, Andhra Pradesh (IN); Kausik Maiti, Ghaziabad (IN); Nishant Misra, Uttar Pradesh (IN)

(73) Assignee: GREY ORANGE PTE. LTD., Singapore (SG)

( * ) Notice: Subject to any disclaimer, the term of this patent is extended or adjusted under 35 U.S.C. 154(b) by 160 days.

(21) Appl. No.: 16/509,154

(22) Filed: Jul. 11, 2019

(65) Prior Publication Data
US 2021/0011487 A1 Jan. 14, 2021

(51) Int. Cl.
*G05D 1/02* (2020.01)

(52) U.S. Cl.
CPC ......... *G05D 1/0289* (2013.01); *G05D 1/0214* (2013.01); *G05D 1/0276* (2013.01); *G05D 1/0291* (2013.01)

(58) Field of Classification Search
CPC .. G05D 1/0289; G05D 1/0214; G05D 1/0276; G05D 1/0291
See application file for complete search history.

(56) References Cited

U.S. PATENT DOCUMENTS

| 11,086,336 B1* | 8/2021 | Bolotski | G05D 1/0088 |
| 2007/0288123 A1* | 12/2007 | D'Andrea | B66F 9/063 |
| | | | 700/214 |
| 2009/0115638 A1* | 5/2009 | Shankwitz | G08G 1/161 |
| | | | 340/988 |

(Continued)

OTHER PUBLICATIONS

International Search Report and Written Opinion of the International Searching Authority dated Sep. 14, 2020 in PCT/IB2020/000565, citing documents AA, AX and AY therein, 16 pages.

(Continued)

*Primary Examiner* — Anne Marie Antonucci
*Assistant Examiner* — Sahar Motazedi
(74) *Attorney, Agent, or Firm* — Oblon, McClelland, Maier & Neustadt, L.L.P.

(57) ABSTRACT

A method for synchronizing movement of transport vehicles in a storage facility is provided. A server determines first and second paths in the storage facility to be traversed by first and second transport vehicles, respectively. The server identifies a common path that corresponds to an overlap between the first and second paths. The server determines a safe distance to be maintained between the first and second transport vehicles, for avoiding a collision therebetween, when the first and second transport vehicles traverse the common path in the same direction. The server communicates a message, indicative of the safe distance, to the second transport vehicle for synchronizing movement of the first and second transport vehicles. Based on the message, the second transport vehicle follows the first transport vehicle along the common path and maintains a distance greater (Continued)

than or equal to the safe distance from the first transport vehicle.

18 Claims, 12 Drawing Sheets

(56) References Cited

U.S. PATENT DOCUMENTS

| | | | |
|---|---|---|---|
| 2013/0325210 A1* | 12/2013 | Palm | G05D 1/0289 |
| | | | 701/2 |
| 2014/0172223 A1* | 6/2014 | Murphy | G05D 1/0289 |
| | | | 701/25 |
| 2019/0100209 A1* | 4/2019 | Plianos | B60W 30/18127 |
| 2019/0129419 A1 | 5/2019 | Lee | |
| 2020/0310418 A1* | 10/2020 | Kanoh | B60W 60/0059 |

OTHER PUBLICATIONS

"Fahrerloses Transportfahrzeug-Wikipedia" Retrieved from the Internet: URL:https://de.wikipedia.org/w/index.php?title)Fahrerloses_Transportfahrzeug&oldid=189945054, XP055727233, Jun. 28, 2019, 14 pages.

Alberto Broggi, et al., "Visual Perception of Obstacles and Vehicles for Platooning" IEEE Transactions on Intelligent Transportation Systems, vol. 1, No. 3, XP011028373, Sep. 1, 2000, pp. 164-176.

* cited by examiner

METHOD AND SYSTEM FOR SYNCHRONIZING MOVEMENT OF TRANSPORT VEHICLES IN A STORAGE FACILITY

FIELD OF THE INVENTION

The present disclosure relates generally to management of storage facilities, and, more particularly to a method and a system for synchronizing movement of transport vehicles in a storage facility.

BACKGROUND

Typically, in a storage facility, inventory items are stored in shelves of storage units. Examples of the inventory items include, but are not limited to, groceries, apparel, or the like. Several such storage facilities (such as storage facilities in warehouses or retail stores) utilize transport vehicles (i.e., automatic guided vehicles) to transport the inventory items or the storage units between various locations in the storage facilities. For example, a transport vehicle in a first storage facility may carry a first storage unit from a first location to a second location in the first storage facility.

With multiple transport vehicles operating simultaneously in the first storage facility, there exists a risk of collision between the transport vehicles. There are serious consequences associated with collisions that may occur between the transport vehicles. For example, a collision between two transport vehicles may result in damage to the transport vehicles and payloads (such as items or storage units) carried by the transport vehicles, leading to a significant loss in revenue. Further, a throughput and/or an efficiency of operations at the first storage facility may be adversely affected as a result of the collision.

There are various conventional methods aiming towards avoiding collisions between transport vehicles. One such conventional method involves determining paths for the transport vehicles, such that paths do not overlap. The paths followed by the transport vehicles in such a scenario are often not optimal, thus, resulting in decreased throughputs for operations at the first storage facility, and a loss of revenue. Another conventional method involves delaying movement of transport vehicles if there exists a possibility of collision between the transport vehicles, which in turn, again decreases the throughputs for the operations at the first storage facility, leading to losses in revenue.

In light of the foregoing, there exists a need for a technical solution that not only prevents collision among transport vehicles in a storage facility but also improves throughputs for operations at the storage facility.

SUMMARY

In an embodiment of the present disclosure, a method for synchronizing movement of transport vehicles in a storage facility is provided. The method includes determining, by a server that is in communication with first and second transport vehicles, first and second paths to be traversed by the first and second transport vehicles, respectively, in the storage facility. A common path, to be traversed by the first and second transport vehicles in a same direction, is identified by the server. The common path corresponds to an overlap between the first and second paths. When the first transport vehicle reaches a starting point of the common path, a first safe distance to be maintained between the first and second transport vehicles is determined by the server. A first message for synchronizing movement of the first and second transport vehicles on the common path is communicated to the second transport vehicle by the server. The first message is indicative of the first safe distance. Based on the first message, the second transport vehicle follows the first transport vehicle along the common path and maintains a distance greater than or equal to the first safe distance from the first transport vehicle.

In another embodiment of the present disclosure, a system for synchronizing movement of transport vehicles in a storage facility is provided. The system includes a server in communication with first and second transport vehicles in the storage facility. The server determines first and second paths to be traversed by the first and second transport vehicles, respectively. The server identifies a common path to be traversed by the first and second transport vehicles in a same direction. The common path corresponds to an overlap between the first and second paths. When the first transport vehicle reaches a starting point of the common path, the server determines a first safe distance to be maintained between the first and second transport vehicles, when the first and second transport vehicles traverse the common path. The server communicates, to the second transport vehicle, a first message for synchronizing movement of the first and second transport vehicles on the common path. The second transport vehicle follows the first transport vehicle along the common path based on the first message and maintains a distance greater than or equal to the first safe distance from the first transport vehicle.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1:
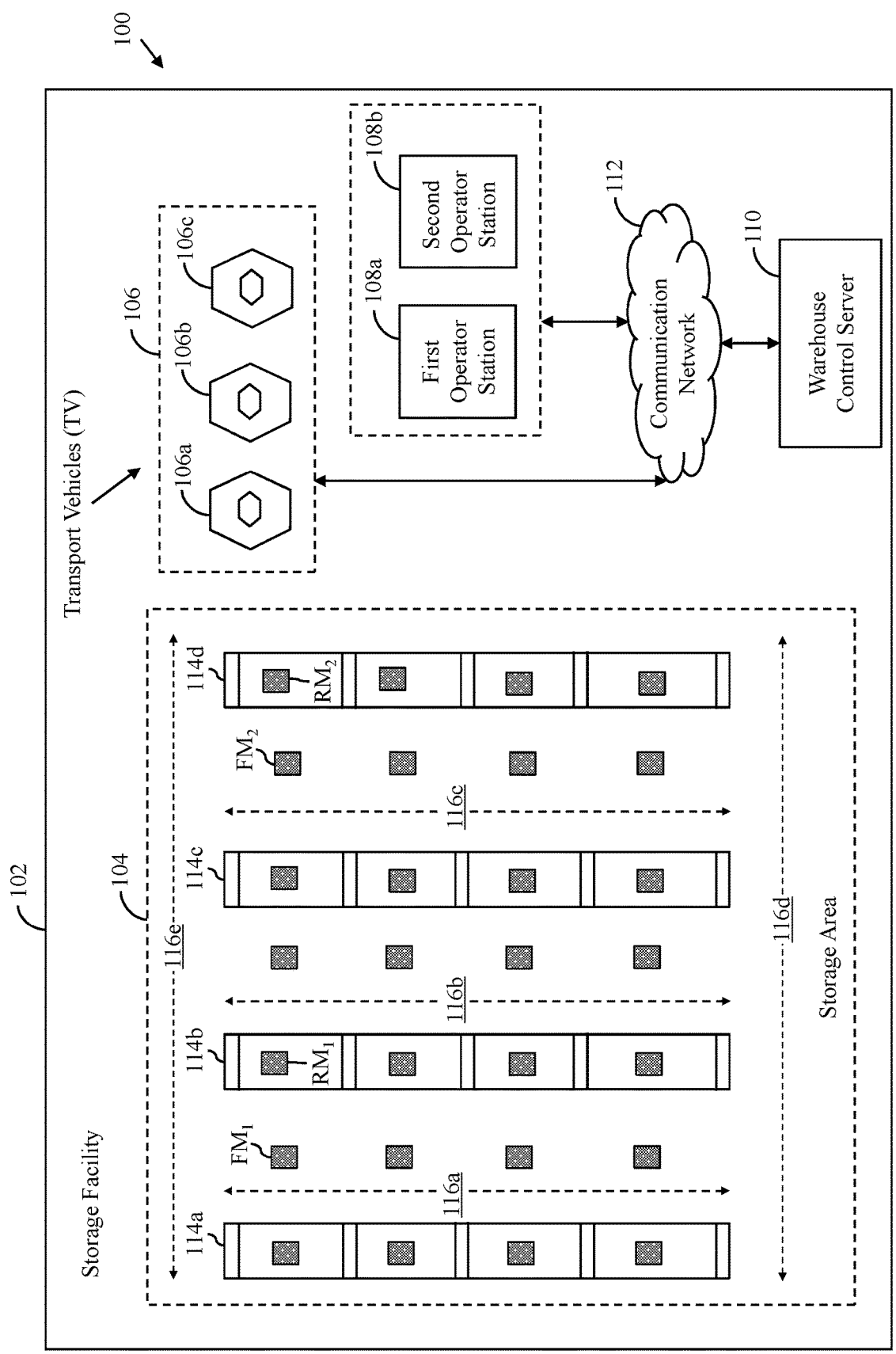
FIG. 1 is a block diagram that illustrates an exemplary environment, in accordance with an embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present disclosure provide a method and a system for synchronizing movement of transport vehicles in a storage facility. A server that is in communication with first and second transport vehicles determines first and second paths to be traversed by the first and second transport vehicles, respectively, in the storage facility. The storage facility may include fiducial markers (e.g., barcodes, quick response codes, or the like) to facilitate navigation of the first and second paths by the first and second transport vehicles, respectively. For example, each of the first and second paths may be associated with a sequence of fiducial markers that need to be navigated for traversing the first and second paths. In one embodiment, the first and second paths are for transporting payloads (e.g., inventory storage units, ISUs) between various locations in the storage facility. Based on the first and second paths, the server determines a common path to be traversed by the first and second transport vehicles. In some embodiments, the common path corresponds to an overlap between the first and second paths. The server determines a first safe distance to be maintained by the first and second transport vehicles therebetween when the first and second transport vehicles traverse the common path. The first safe distance may be determined based on a first set of factors. The first set of factors may include first and second dimensions of first and second transport vehicles, respectively, third and fourth dimensions of first and second payloads, respectively, or the like. The first set of factors may further include first and second weights of the first and second payloads, respectively, first and second velocity profiles (such as peak velocity, acceleration rate, deceleration rate, or the like) of the first and second transport vehicles, respectively.

In some embodiments, the server communicates first and second messages to the first and second transport vehicles when at least one of the first and second transport vehicles reaches a starting point of the common path. In one embodiment, the first transport vehicle reaches the starting point before the second transport vehicle. The second message may include one or more parameters that specify or indicate the first safe distance. Based on the first and second messages, the first and second transport vehicles traverse the common path synchronously in a leader-follower configuration. The second transport vehicle maintains a distance greater than or equal to the first safe distance from the first transport vehicle, thereby preventing collision and improving throughputs for operations at the storage facility.

Terms Description (in Addition to Plain and Dictionary Meaning)

In some embodiments, "Storage facility" may be a warehouse or a retail store that includes one or more storage units for storing inventory items. The storage facility may further include one or more aisles for transport vehicles to move in the storage facility. Examples of the storage facility may include, but are not limited to, a forward warehouse, a backward warehouse, or a retail store.

In some embodiments, "Transport vehicle" is an automated guided vehicle (AGV) that transports items or storage units from one location to another in a storage facility. For example, a first transport vehicle may transport a storage unit from a first location to a second location in the storage facility for item retrieval or item placement in the storage unit.

In some embodiments, "Common path" is a path that corresponds to an overlap between two or more paths followed by transport vehicles in a storage facility. For example, a first common path corresponds to an overlap between first and second paths followed by first and second transport vehicles, respectively. In other words, the first common path is a section of the first path that overlaps with the second path.

In some embodiments, "Safe distance" is a minimum distance that is to be maintained between two transport vehicles, for avoiding a collision therebetween, when the two transport vehicles are travelling along a common path in the same direction. For example, when first and second transport vehicles are travelling along a common path in the same direction, a distance of 50 centimeters (cms) may be required to be maintained therebetween to avoid a collision between the first and second transport vehicles. In such a scenario, the safe distance is 50 cms.

In some embodiments, "Leader-follower configuration" is a formation in which two or more transport vehicles traverse a common path in the same direction. The transport vehicles, in a leader-follower configuration, traverse the common path, maintaining a safe distance therebetween. For example, first and second transport vehicles may traverse the common path in a leader-follower configuration, such that the second transport vehicle follows the first transport vehicle along the common path, constantly maintaining the safe distance therebetween. In such a scenario, the first transport vehicle serves as a leader and the second transport vehicle following the first transport vehicle serves as a follower.

In some embodiments, "Payload" refers to items or material storage units carried by a transport vehicle. For example, a first transport vehicle may transport a first storage unit from a first location to a second location in the storage facility. In such a scenario, the first storage unit corresponds to the payload of the first transport vehicle.

FIG. 1 is a block diagram that illustrates an exemplary environment 100, in accordance with an embodiment of the present disclosure. The environment 100 shows a storage facility 102. The storage facility 102 includes a storage area 104, first through third transport vehicles 106a-106c (hereinafter, the first through third transport vehicles 106a-106c are referred to as 'transport vehicles 106'), first and second operator stations 108a and 108b (hereinafter, the first and second operator stations 108a and 108b are referred to as 'operator stations 108'), and a warehouse control server (WCS) 110. The WCS 110 communicates with the transport vehicles 106 and the operator stations 108 by way of a communication network 112 or through separate communication networks established therebetween.

Figure 2B:
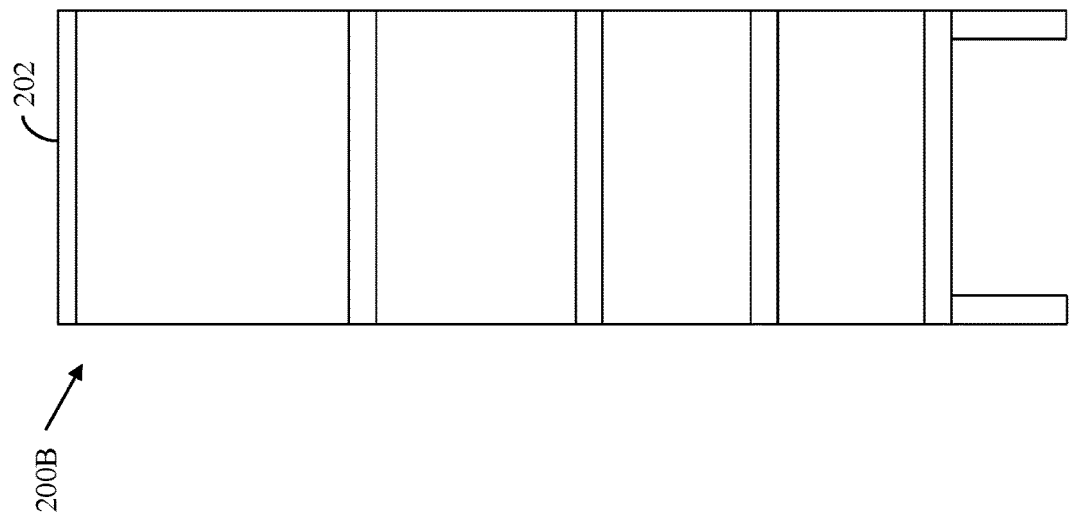
FIG. 2B is a block diagram that illustrates a side view of the PSU, in accordance with an embodiment of the present disclosure.
Figure 2A:
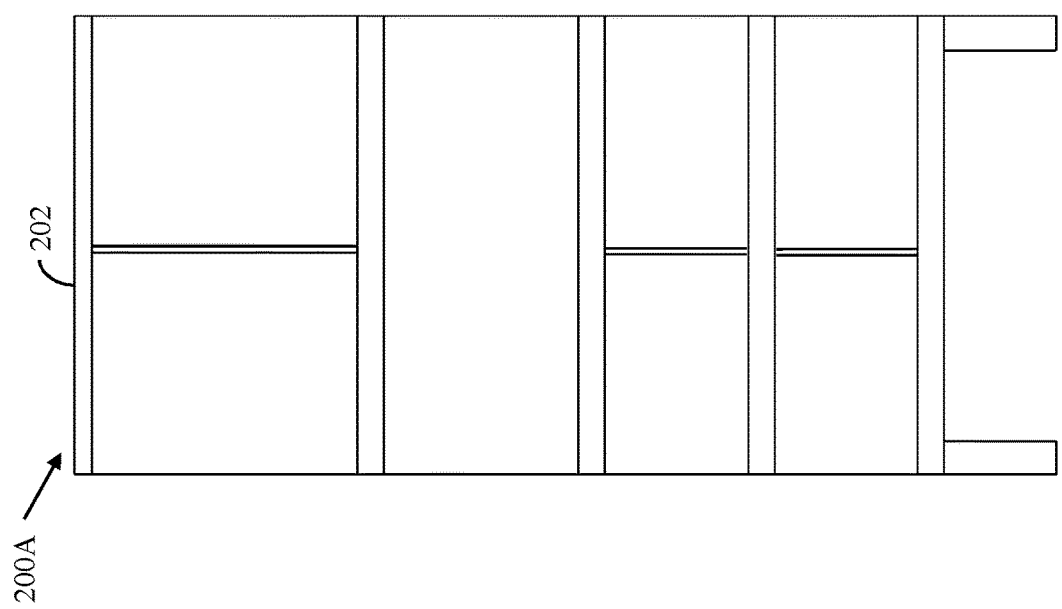
FIG. 2A is a block diagram that illustrates a front view of a portable storage unit (PSU), in accordance with an embodiment of the present disclosure.

The storage facility 102 stores multiple inventory items for fulfillment and/or selling. Examples of the storage facility 102 may include, but are not limited to, a forward warehouse, a backward warehouse, a fulfilment center, or a retail store (e.g., a supermarket, an apparel store, or the like). Examples of the inventory items may include, but are not limited to, groceries, apparel, or the like. The inventory items are stored in the storage area 104. The storage area 104 may be of any shape, for example, a rectangular shape. The storage area 104 includes first through fourth inventory storage units (ISUs) 114a-114d for storing the inventory items. Hereinafter, the first through fourth ISUs 114a-114d are collectively referred to as 'ISUs 114'. Each inventory storage unit 114 is a combination of various portable storage units (PSUs) (as shown in FIGS. 2A and 2B). In other words, each ISU 114 is formed by linearly arranging the PSUs. One or more inventory items are allocated to each PSU and each PSU stores the corresponding allocated inventory items. In one embodiment, the PSUs may have different shapes, sizes, and dimensions. Hereinafter, the terms 'inventory items' and "items" are used interchangeably.

The ISUs 114 are arranged such that first through fifth aisles 116a-116e (hereinafter, the first through fifth aisles 116a-116e are collectively referred to as 'aisles 116') are formed therebetween. The first aisle 116a is formed between the first and second ISUs 114a and 114b. The second aisle 116b is formed between the second and third ISUs 114b and 114c. Similarly, the third aisle 116c is formed between the third and fourth ISUs 114c and 114d. The fourth and fifth aisles 116d and 116e are formed between side faces of the ISUs 114 and sidewalls of the storage area 104. The aisles 116 are passageways used by customers or the transport vehicles 106 to move in the storage area 104. Arrangement of the ISUs 114 is a standard practice and will be apparent to those of skill in the art. In a non-limiting example, it is assumed that the ISUs 114 are arranged such that a layout of the aisles 116 forms a virtual grid in a rectangular space. Thus, each aisle 116 is one of a horizontal aisle or a vertical aisle. For example, the first aisle 116a is a vertical aisle and the fourth aisle 116d is a horizontal aisle. An intersection between horizontal and vertical aisles forms a cross-aisle.

In some embodiments, the storage facility 102 may be marked with various fiducial markers (such as fiducial markers $FM_1$, $FM_2$, $RM_1$, and $RM_2$). For the sake of simplicity, the storage area 104 has been shown to include multiple fiducial markers and only the fiducial markers $FM_1$, $FM_2$, $RM_1$, and $RM_2$ have been labelled. It will be apparent to those of skill in the art that the entire storage facility 102 may include the fiducial markers without deviating from the scope of the invention. Each fiducial marker may correspond to one of two types—location markers (such as the fiducial markers $FM_1$ and $FM_2$) and storage unit markers (such as the fiducial markers $RM_1$ and $RM_2$). The location markers (such as the fiducial markers $FM_1$ and $FM_2$) are located at pre-determined locations in the storage facility 102. The pre-determined locations do not need to conform to any specific pattern, and may be subject to a configuration of the storage facility 102. For example, the fiducial markers $FM_1$ and $FM_2$ are located at first and second locations (e.g., on the floor of the storage area 104) along the first and third aisles 116a and 116c, respectively. The storage unit markers (such as the fiducial markers $RM_1$ and $RM_2$) may uniquely identify each PSU that constitutes the ISUs 114. For example, the fiducial markers $RM_1$ and $RM_2$ uniquely identify PSUs that partly constitute the second and fourth ISUs 114b and 114d, respectively. Examples of the fiducial markers include, but or not limited to, barcodes, quick response (QR) codes, radio frequency identification device (RFID) tags, or the like. In one embodiment, a placement of the fiducial markers is uniform (i.e., a distance between consecutive fiducial markers is constant). In another embodiment, the placement of the fiducial markers may be non-uniform (i.e., a distance between consecutive fiducial markers is variable).

In some embodiments, the transport vehicles 106 are robotic vehicles that move in the storage facility 102. For example, the transport vehicles 106 are automatic guided vehicles (AGVs) that are responsive to commands received from the WCS 110. The transport vehicles 106 may retrieve the PSUs based on the commands received from the WCS 110. The transport vehicles 106 may include suitable logic, instructions, circuitry, interfaces, and/or codes, executable by the circuitry, for transporting payloads (e.g., the PSUs) in the storage facility 102. For example, the transport vehicles 106 may carry and transport the PSUs from the storage area 104 to the operator stations 108 and from the operator stations 108 to the storage area 104 for fulfilment of orders, loading of inventory items into the PSUs, and/or the like. The transport vehicles 106 are capable of reading the fiducial markers (e.g., the fiducial markers $FM_1$, $FM_2$, $RM_1$, and $RM_2$). The transport vehicles 106 may include various sensors (such as image sensors, RFID sensors, and/or the like) for reading the fiducial markers. Each transport vehicle 106 may utilize the fiducial markers for determining its relative position within the storage facility 102 and/or identifying the PSUs.

The operator stations 108 in the storage facility 102 are pick-and-put stations (PPSs) where the inventory items are placed in the PSUs and/or retrieved from the PSUs. The PSUs are transported to the operator stations 108 by the transport vehicles 106. Although the storage facility 102 is shown to include two operator stations 108, it will be apparent to those of skill in the art that the storage facility 102 may include any number of operator stations without deviating from the scope of invention. The operator stations 108 may include instruction devices that receive various commands or instructions from the WCS 110 for placing one or more inventory items in the PSUs or retrieving one or more inventory items from the PSUs. Based on the received commands or instructions, operators (e.g., human operators and robotic operators) in the operator stations 108 place the inventory items in the PSUs or retrieve the inventory items from the PSUs.

The WCS 110 is a network of computers, a software framework, or a combination thereof, that may provide a generalized approach to create the server implementation. Examples of the WCS 110 include, but are not limited to, personal computers, laptops, mini-computers, mainframe computers, any non-transient and tangible machine that can execute a machine-readable code, cloud-based servers, distributed server networks, or a network of computer systems. The WCS 110 may be realized through various web-based technologies such as, but not limited to, a Java web-framework, a .NET framework, a personal home page (PHP) framework, or any other web-application framework. The WCS 110 may be maintained by a warehouse management authority or a third-party entity that facilitates inventory management operations for the storage facility 102. It will be understood by a person having ordinary skill in the art that the WCS 110 may perform other warehouse management operations in addition to the inventory management operations. Embodiments of various components of the WCS 110 and their functionalities are described later in conjunction with FIG. 8.

Figure 8:
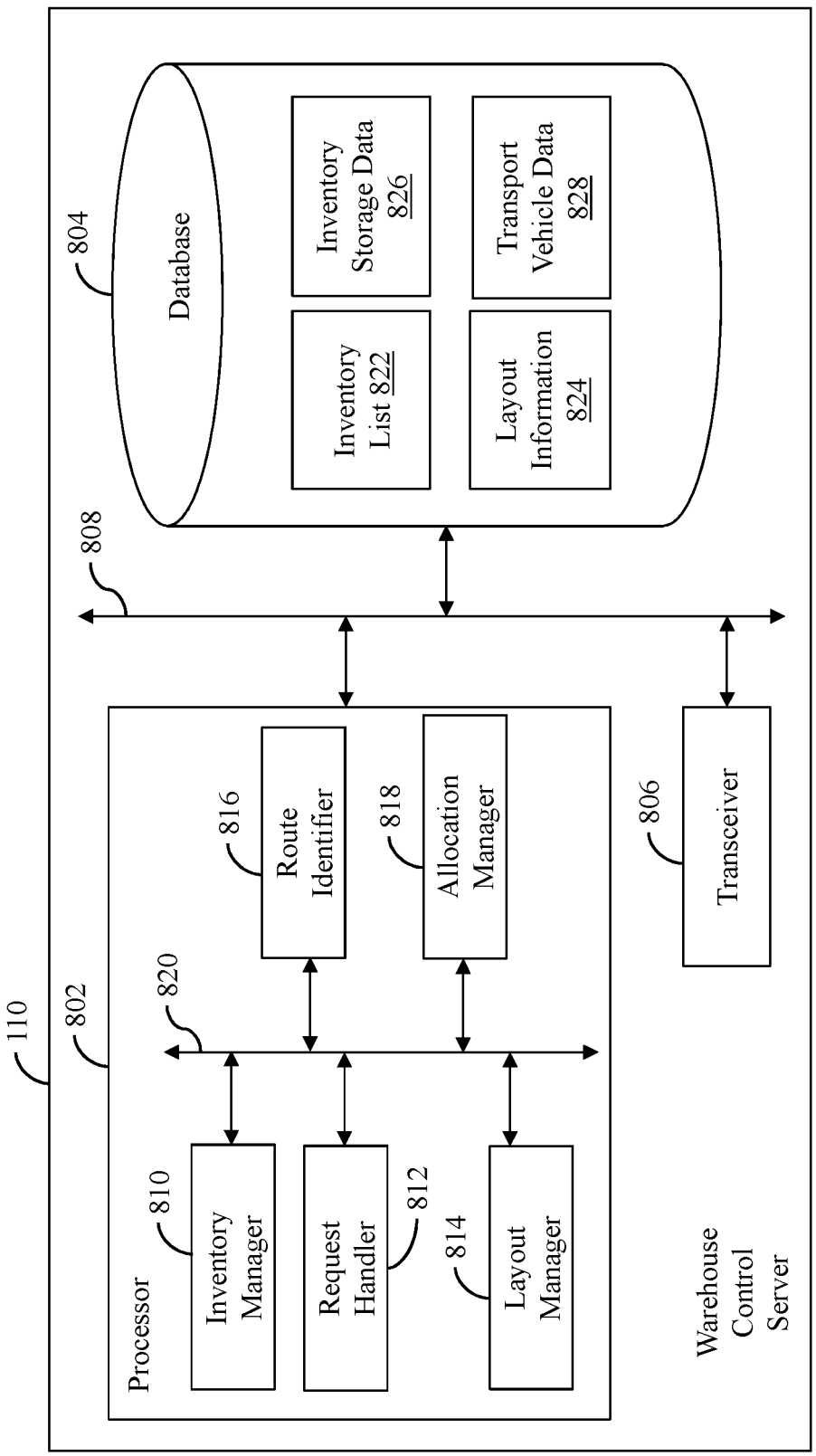
FIG. 8 is a block diagram that illustrates a warehouse control server of FIG. 1, in accordance with an embodiment of the present disclosure.

The WCS 110 may store, in a memory of the WCS 110, a virtual map and inventory storage data (as shown in FIG. 8) of the storage facility 102. The virtual map is indicative of locations of the ISUs 114, the PSUs, the operator stations 108, entry and exit points of the storage facility 102, the fiducial markers in the storage facility 102, or the like. The inventory storage data is indicative of associations between the inventory items stored in the storage facility 102 and the PSUs in the storage facility 102. The WCS 110 receives various requests from an external communication server for item retrieval from the storage facility 102 and item placement in the storage facility 102. Based on the received requests, the WCS 110 may identify one or more PSUs in the storage facility 102 that are associated with inventory items indicated by the received requests.

After the identification of the PSUs, the WCS 110 determines optimal paths in the storage facility 102 that need to be traversed for transporting the identified PSUs from the storage area 104 to the operator stations 108. The WCS 110 further identifies one or more transport vehicles from the transport vehicles 106 which are available for traversing the optimal paths to transport the identified PSUs. After the identification of the available transport vehicles, the WCS 110 communicates commands to the identified transport vehicles to retrieve the identified PSUs from the storage area 104. A command, communicated by the WCS 110, to an identified transport vehicle (e.g., the first transport vehicle 106a) may include navigation information for the first transport vehicle 106a to reach, from a current location of the first transport vehicle 106a, a first location of an identified PSU and, then, a second location of the operator stations 108 from the first location. In other words, the navigation information defines the optimal path to reach the operator stations 108 from the current location after the identified PSU is picked by the first transport vehicle 106a. The optimal path is associated with, in some examples, various fiducial markers that need be traversed by the first transport vehicle 106a. For example, the optimal path is defined by a sequence of the fiducial markers that are to be traversed by the first transport vehicle 106 to reach the operator stations 108 from the current location after picking the identified PSU. The navigation information may further include an identifier (e.g., a storage unit marker) of the identified PSU that is to be transported by the first transport vehicle 106.

The WCS 110 may further receive information pertaining to real-time locations of the transport vehicles 106. For example, when the first transport vehicle 106a is moving along the optimal path, the first transport vehicle 106a notifies the WCS 110 every time the first transport vehicle 106a traverses a fiducial marker included in the optimal path. For example, each transport vehicle 106 notifies the WCS 110 every time it crosses a fiducial marker in the storage facility 102. At any instance of time, there may be multiple transport vehicles 106 moving in the storage facility 102. Thus, the WCS 110 executes one or more operations to avoid collisions among the transport vehicles 106 that are moving in the storage facility 102. In one exemplary scenario, first and second optimal paths determined by the WCS 110 may overlap, i.e., the first and second optimal paths may have a common path therebetween. If the WCS 110 determines that the first and second transport vehicles 106a and 106b that are to traverse the first and second optimal paths, respectively, may collide while traversing the common path, the WCS 110 determines a safe distance that is to be maintained between the first and second transport vehicles 106a and 106b while traversing the common path to avoid collision. The WCS 110 communicates information pertaining to the safe distance to the first and second transport vehicles 106a and 106b. Based on the safe distance information, the first and second transport vehicles 106a and 106b traverse, in synchronization, the common path in a leader-follower formation (i.e., a leader-follower configuration), where one of the transport vehicles is followed the other transport vehicle. The first and second transport vehicles 106a and 106b, thus, maintain a distance greater than or equal to the safe distance therebetween while traversing the common path. Embodiments of the operations performed by the WCS 110 to avoid collisions among the transport vehicles 106 are explained in detail in conjunction with FIGS. 4 and 5.

The communication network 112 is a medium through which content and messages are transmitted between the WCS 110, the transport vehicles 106, and the operator stations 108. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

FIG. 2A is a block diagram that illustrates a front view 200A of a first PSU, in accordance with an embodiment of the invention. Hereinafter, the first PSU is referred to and designated as "first PSU 202". As shown in FIG. 2A, the first PSU 202 may include one or more shelves to store inventory items. In an exemplary scenario, the first PSU 202 partly constitutes the second ISUs 114b. For the sake of simplicity, the first PSU 202 is shown to be empty.

FIG. 2B is a block diagram that illustrates a side view 200B of the first PSU 202, in accordance with an embodiment of the present disclosure. It will be apparent to those of skill in the art that other PSUs that constitute the ISUs 114 may be structurally different from the first PSU 202. The PSUs may be structurally different due to differences in dimensions, sizes, and/or configurations of the PSUs.

Figure 3B:
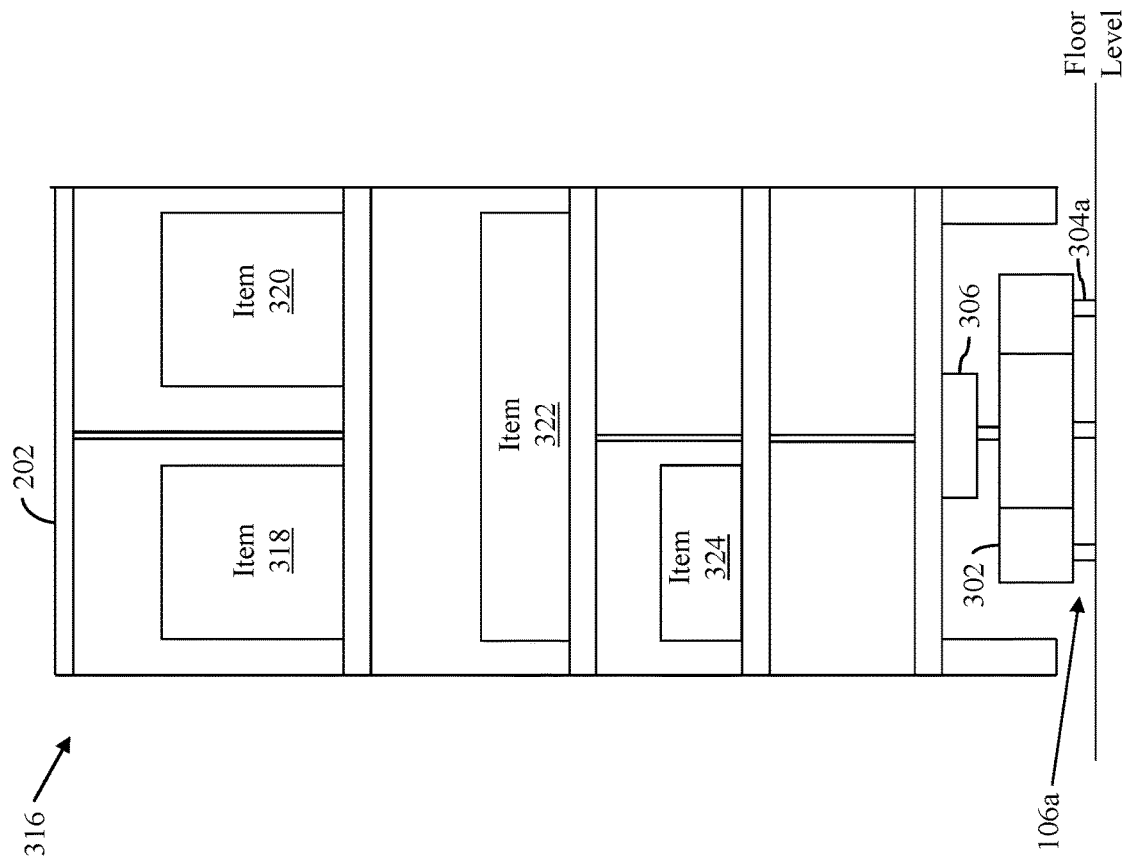
FIG. 3B is a block diagram that illustrates the first transport vehicle carrying a payload, in accordance with an embodiment of the present disclosure.
Figure 3A:
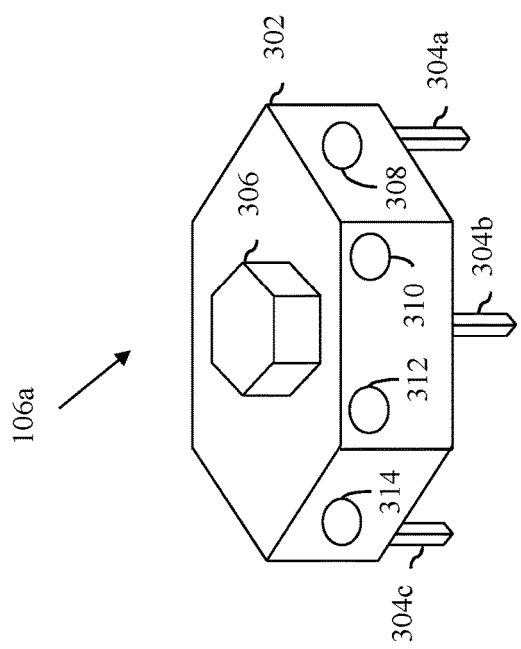
FIG. 3A is a block diagram that illustrates a first transport vehicle of FIG. 1, in accordance with an embodiment of the present disclosure.

FIG. 3A is a block diagram that illustrates the first transport vehicle 106a, in accordance with an embodiment of the present disclosure. The first transport vehicle 106a includes a first body 302, a first moving mechanism 304 (such as first through third wheels 304a-304c, respectively), and a first contact plate 306. The first body 302 may include a first controller to control functions of the first transport vehicle 106a. The first controller receives commands and messages from the WCS 110 by way of a first transceiver included in the first body 302. The first controller may include a navigation unit (e.g., a global positioning system, GPS) that receives navigation information from the WCS 110. The navigation information may include details of optimal paths (e.g., the first optimal path) that are to be traversed by the first transport vehicle 106a. The first body 302 may further include a first obstacle detection system (ODS) 308, a first fiducial marker reading system (FMRS) 310, a first weight measurement system (WMS) 312, a first watchdog module 314, or the like. The first body 302 may further include a motor to control the first moving mechanism 304. The motor is subject to control by the first controller based on the navigation information.

The first ODS 308 may include suitable logic, instructions, circuitry, interfaces, and/or codes, executable by the circuitry, for detecting obstacles in an optimal path traversed by the first transport vehicle 106a. If the first ODS 308 detects an obstacle, the first controller may decelerate the first transport vehicle 106a to bring the first transport vehicle 106a to a halt, thereby avoiding a collision of the first transport vehicle 106a with the obstacle.

The first FMRS 310 may include suitable logic, instructions, circuitry, interfaces, and/or codes, executable by the circuitry, for scanning and reading the fiducial markers and, consequently, navigating the optimal path allocated to the first transport vehicle 106a. The first FMRS 310 may communicate details of a fiducial marker to the first controller when the first transport vehicle 106a reaches the fiducial marker. Consequently, the first controller may communicate the details of the fiducial marker to the WCS 110 by way of the first transceiver included in the first body 302. The WCS 110 tracks the movement of the first transport vehicle 106a by way of the details of the fiducial markers communicated by the first controller to the WCS 110.

The first WMS 312 includes suitable logic, instructions, circuitry, interfaces, and/or codes, executable by the circuitry, for measuring a weight of a payload (e.g., a PSU) carried by the first transport vehicle 106a. Based on the weight of the payload, the first controller controls a lifting mechanism that is used to raise the first contact plate 306 for raising the payload. The first contact plate 306 may be raised or lowered based on the weight of the payload to lower a center of gravity of the first transport vehicle 106a. A low center of gravity may be necessary to ensure that the payload is stable when carried by the first transport vehicle 106. The height by which a payload is raised above a floor level of the floor is dependent upon the weight of the payload, an evenness of the floor, or the like.

The first watchdog module 314 includes suitable logic, instructions, circuitry, interfaces, and/or codes, executable by the circuitry, for bringing the first transport vehicle 106a to a halt. The first watchdog module 314 may include a first timer that may be set to a timer value such that the first transport vehicle 106a is halted when the first timer times out.

It will be apparent to those of skill in the art that the second and third transport vehicles 106b and 106c are functionally similar to the first transport vehicle 106a. The second and third transport vehicles 106b and 106c may be structurally different from the first transport vehicle 106a. For example, a size, a shape, or dimensions of the second transport vehicle 106b may be different from a size, a shape, or dimensions of the first transport vehicle 106a.

FIG. 3B is a block diagram 316 that illustrates the first transport vehicle 106a carrying a payload, in accordance with an embodiment of the present disclosure. The first transport vehicle 106a may reach a location of the first PSU 202 (i.e., the payload) and carry the first PSU 202 based on commands received from the WCS 110. In a non-limiting example, the first PSU 202 stores inventory items 318-324. As shown in FIG. 3B, the first contact plate 306 is raised to carry the first PSU 202.

Figure 4:
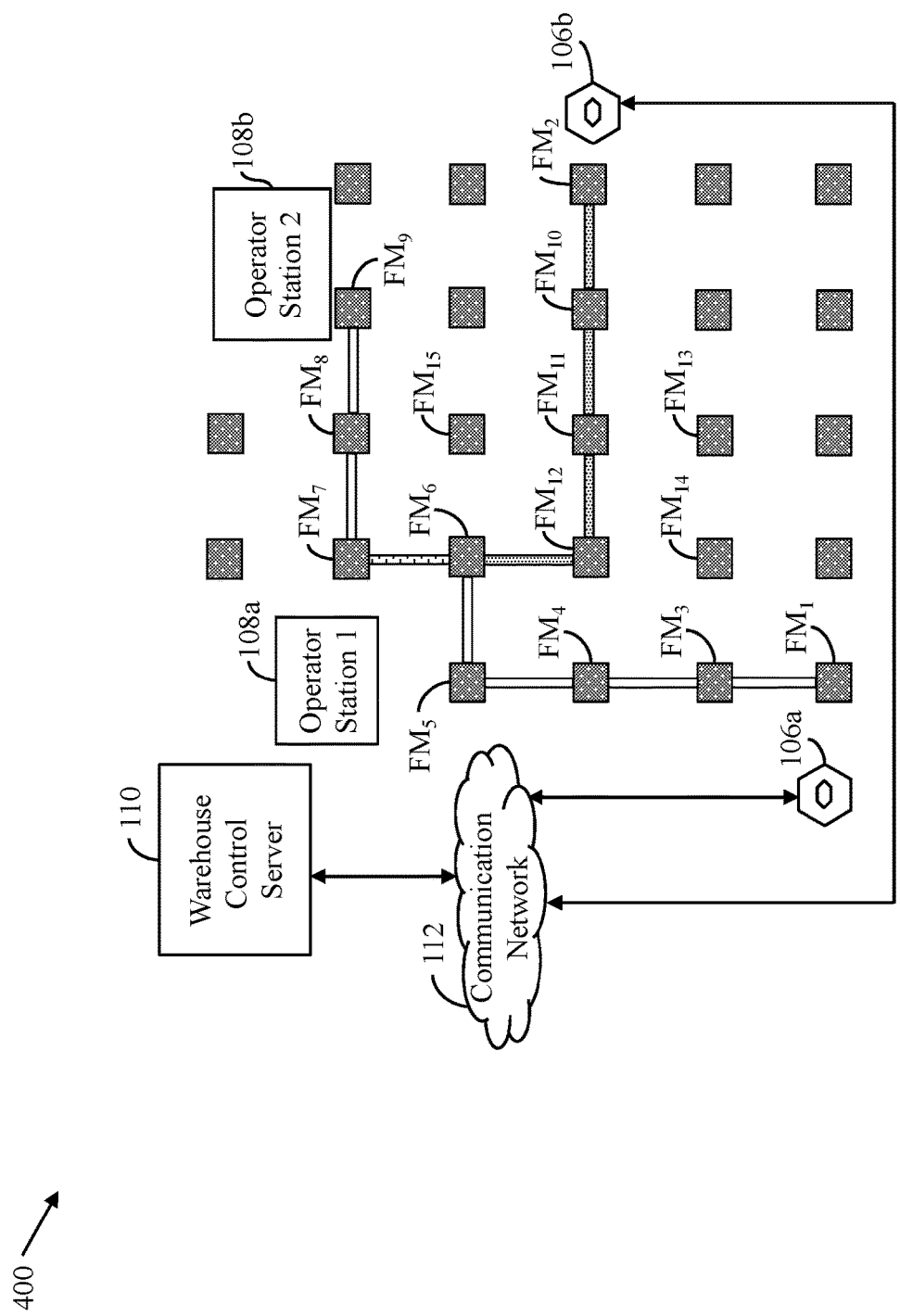
FIG. 4 is a block diagram of an exemplary scenario that describes a method for synchronizing movement of the first transport vehicle and a second transport vehicle of FIG. 1, in accordance with an embodiment of the present disclosure.

FIG. 4 is a block diagram of an exemplary scenario 400 that describes a method for synchronizing movement of the first and second transport vehicles 106a and 106b, in accordance with an embodiment of the present disclosure. The scenario 400 involves the first and second transport vehicles 106a and 106b, the operator stations 108, the WCS 110, the communication network 112, and the fiducial markers in the storage facility 102.

The WCS 110 receives first and second requests from the external communication server. In one embodiment, the first and second requests are item retrieval requests. In another embodiment, the first and second requests are item placement requests. In a non-limiting example, it is assumed that the first request is an item retrieval request and the second request is an item placement request. The first request includes information pertaining to first through third items that are to be retrieved from the storage facility 102 and the second request includes information pertaining to fourth and fifth items that are to be stored in the storage facility 102. The WCS 110 retrieves the virtual map of the storage facility 102 and the inventory storage data of the storage facility 102 from its memory. Based on the inventory storage data, the WCS 110 identifies various PSUs that are associated with the first through fifth items. For example, the first PSU 202 is associated with the first, second, fourth, and fifth items. Similarly, a second PSU is associated with the third item. In this example, it is assumed that the first operator station 108a is allocated a task of item retrieval and the second operator station 108b is allocated a task of item placement. Thus, the WCS 110 determines that the first PSU 202 has to be transported to the first operator station 108a for the retrieval of the first and second items therefrom and to the second operator station 108b for the placement of the fourth and fifth items therein. The WCS 110 further determines that the second PSU has to be transported to the first operator station 108a for the retrieval of the third item therefrom. In another embodiment, each operator station may be capable of retrieving and placing items in the PSUs without deviating from the scope of the invention.

The WCS 110 then identifies the locations of the first PSU 202 and the second PSU by referring to the virtual map. In an exemplary scenario, the WCS 110 identifies that the first PSU 202 and the second PSU are associated with the fiducial markers (i.e., the storage unit markers) $RM_1$ and $RM_2$ and partly constitute the second and fourth ISUs 114b and 114d, respectively. The WCS 110 may further identify that the first PSU 202 and the second PSU are accessible from the first and third aisles 116a and 116c, respectively, and are located adjacent to the fiducial markers $FM_1$ and $FM_2$ in the first and third aisles 116a and 116c, respectively (as shown in FIG. 1).

Based on the identification of the first PSU 202 and the second PSU, the WCS 110 determines first and second optimal paths, that includes the fiducial markers $FM_1$ and $FM_2$, for transporting the first PSU 202 and the second PSU, respectively. The WCS 110 determines the first and second optimal paths based on various factors such as a cost associated with a path, a required throughput, or the like. The cost associated with a path may be a function of an estimated time taken to traverse the path, a number of fiducial markers to be traversed in the path, and/or the like. In one exemplary scenario, the first optimal path determined by the WCS 110 may include sequential traversal of the fiducial markers $FM_1$, $FM_3$, $FM_4$, $FM_5$, $FM_6$, $FM_7$, $FM_8$, and $FM_9$ (i.e., $FM_1 \rightarrow FM_3 \rightarrow FM_4 \rightarrow FM_5 \rightarrow FM_6 \rightarrow FM_7 \rightarrow FM_8 \rightarrow FM_9$). Similarly, the second optimal path determined by the WCS 110 may include sequential traversal of the fiducial markers $FM_2$, $FM_{10}$, $FM_{11}$, $FM_{12}$, $FM_6$, and $FM_7$ (i.e., $FM_2 \rightarrow FM_{10} \rightarrow FM_{11} \rightarrow FM_{12} \rightarrow FM_6 \rightarrow FM_7$).

After determining the first and second optimal paths, the WCS 110 determines whether there is any overlap between the first and second optimal paths. As both the first and second optimal paths mandate the traversal of the fiducial markers $FM_6$ and $FM_7$, the WCS 110 determines that there is an overlap between the first and second optimal paths. The WCS 110, then, identifies a first common path that corresponds to the overlap between the first and second optimal paths. Here, the first common path is a path between the fiducial markers $FM_6$ and $FM_7$.

The WCS 110 further identifies transport vehicles that are available for transporting the first PSU 202 and the second PSU from the storage area 104 to the operator stations 108. The WCS 110 may identify the available transport vehicles based on various factors such as a proximity of a transport vehicle to an identified PSU, a required throughput for fulfilling the first and second requests, or the like. It will be apparent to a person of skill in the art that the WCS 110 may select the available transport vehicles such that the throughput for fulfilling the first and second requests is maximized. In one exemplary scenario, the WCS 110 identifies that the first through third transport vehicles 106a-106c are available. The first and second transport vehicles 106a and 106b may be located at first and second initial locations corresponding to the fiducial markers $FM_1$ and $FM_2$, respectively. Thus, the WCS 110 selects the first and second transport vehicles 106a and 106b for transporting the first PSU 202 and the second PSU, respectively.

Based on the identification of the first common path and the available transport vehicles (i.e., the first and second transport vehicles 106a and 106b), the WCS 110 determines a likelihood of collision between the first and second transport vehicles 106a and 106b when the first and second transport vehicles 106a and 106b traverse the first common path. To determine the likelihood of collision, the WCS 110 may estimate positions of the first and second transport vehicles 106a and 106b at various time instants. If the WCS 110 determines that a collision between the first and second transport vehicles 106a and 106b is likely, the WCS 110 may determine an alternate path that may be traversed by one of the first and second transport vehicles 106a and 106b for avoiding the collision. In some scenarios, the alternate path may be a sub-optimal path. In other words, there may be a penalty (such as a time penalty) associated with one of the first and second transport vehicles 106a and 106b traversing the alternate path. Consequently, the WCS 110 determines that the throughput may be affected when one of the first and second transport vehicles 106a and 106b traverses the alternate path. In such a scenario, the WCS 110 may perform a cost-benefit analysis to determine if the first and second transport vehicles 106a and 106b should traverse the first and second paths or if one of the first and second transport vehicles 106a and 106b should traverse the alternate path. In performing the cost-benefit analysis, the WCS 110 determines whether the alternate path is viable (i.e., whether a penalty associated with the alternate path is acceptable). In one exemplary scenario, the WCS 110 may determine that the time penalty associated with the first or second transport vehicle 106a or 106b traversing the alternate path is beyond a pre-determined threshold, which may result in the WCS 110 determining that the alternate path is not viable. In a non-limiting example, the WCS 110 determines that an alternate path is not viable by determining that none of the available alternate paths are viable.

When the WCS 110 determines that the alternate path is not viable and the first and second transport vehicles 106a and 106b have to traverse the first and second optimal paths, respectively, the WCS 110 determines a first safe distance that is to be maintained by the second transport vehicle 106b from the first transport vehicle 106a while traversing the first common path to prevent collision therebetween. The WCS 110 may determine the first safe distance based on a first set of factors. The first set of factors may include first and second dimensions (such as lengths and breadths) of the first and second transport vehicles 106a and 106b, third and fourth dimensions of first and second payloads (i.e., the first PSU 202 and the second PSU). In one scenario, the third and fourth dimensions may be smaller than or equal to the first and second dimensions, respectively. In another scenario, the third and fourth dimensions may be greater than the first and second dimensions, respectively. In such a scenario, the WCS 110 takes the third and fourth dimensions into account while determining the first safe distance. In one example, the WCS 110 may determine the first safe distance such that when the first safe distance is maintained between the first and second transport vehicles 106a and 106b, the first and second payloads are not in contact. In another example, the WCS 110 may determine the first safe distance such that when the first safe distance is maintained between the first and second transport vehicles 106a and 106b, the first and second payloads are in contact but do not exert enough force on each other to cause the payloads to be dislodged from the transport vehicles. The first set of factors may further include first and second weights of the first and second payloads, first and second velocity profiles (such as peak velocity, acceleration rate, deceleration rate, or the like) of the first and second transport vehicles 106a and 106b, respectively. For example, the WCS 110 may consider the deceleration rate of the second transport vehicle 106b while determining the first safe distance. As the first safe distance is determined based on the deacceleration rate of the second transport vehicle 106b, the second payload (i.e., the second PSU) is prevented from toppling when the second transport vehicle 106b has to deaccelerate for maintaining the first safe distance from the first transport vehicle 106a while traversing the first common path. It will be apparent to those of skill in the art that the first safe distance may take any value that indicates a length (e.g., feet, meters, etc.). For the sake on ongoing description of FIG. 4, it is assumed that the first safe distance determined by the WCS 110 is equal to a distance between two consecutive fiducial markers (e.g., a distance between the fiducial markers $FM_6$ and $FM_7$). In other examples, the first safe distance may be distance that is less than the distance between two consecutive fiducial markers.

The WCS 110, then, communicates first and second messages to the first and second transport vehicles 106a and 106b, respectively. The first and second messages include navigation information of the first and second optimal paths that are to be traversed by the first and second transport vehicles 106a and 106b, respectively. For example, the first message includes information pertaining to the fiducial markers $FM_1$, $FM_3$, $FM_4$, $FM_5$, $FM_6$, $FM_7$, $FM_8$, and $FM_9$ of the first optimal path. Likewise, the second message includes information pertaining to the fiducial markers $FM_2$, $FM_{10}$, $FM_{11}$, $FM_{12}$, $FM_6$, and $FM_7$ of the second optimal path. The first and second messages may further include information pertaining to the fiducial markers $RM_1$ and $RM_2$ associated with the first PSU 202 and the second PSU, respectively, that are to be transported by the first and second transport vehicles 106a and 106b, respectively.

Based on the first and second messages, the first and second transport vehicles 106a and 106b identify and pick up the first and second payloads (i.e., the first PSU 202 and the second PSU), respectively. After picking up the first and second payloads (i.e., the first PSU 202 and the second PSU), the first and second transport vehicles 106a and 106b begin to traverse the first and second optimal paths, respectively.

In some embodiments, in order to avoid a collision between the first and second transport vehicles 106a and 106b when the first and second transport vehicles 106a and 106b traverse the first common path, the WCS 110 implements a synchronize-movement method. The WCS 110 may implement the synchronize-movement method when one of the first and second transport vehicles 106a and 106b reach the first common path. In one exemplary scenario, based on the real-time location information received by the WCS 110 from the first and second transport vehicles 106a and 106b, the WCS 110 determines that at a first time instant $t_1$, the first transport vehicle 106a is at the fiducial marker $FM_6$ and the second transport vehicle 106b is at the fiducial marker $FM_{12}$. The WCS 110 then determines that the first transport vehicle 106a is at a starting point (i.e., $FM_6$) of the first common path and is ahead of the second transport vehicle 106b. The WCS 110 then communicates first and second 'sync-move' (SM) messages to the first and second transport vehicles 106a and 106b, respectively, for implementing the synchronize-movement method. The first and second SM messages indicate a designation of the first and second transport vehicles 106a and 106b as a leader and a follower, respectively. The second SM message may further include information pertaining to the first safe distance determined by the WCS 110.

The first and second transport vehicles 106a and 106b receive the first and second SM messages. Based on the first and second SM messages, the first and second transport vehicles 106a and 106b begin to move synchronously (i.e., movement of the first and second transport vehicles 106a and 106b is synchronized) along the first common path. The first transport vehicle 106a begins moving, from the fiducial marker $FM_6$, towards the fiducial marker $FM_7$. Simultaneously, the second transport vehicle 106b begins moving, from the fiducial marker $FM_{12}$, towards the fiducial marker $FM_6$. The second transport vehicle 106b maintains, from the first transport vehicle 106a, a separation greater than or equal to the first safe distance. In an example, if the first transport vehicle 106a comes to a halt when the first transport vehicle 106a detects an obstacle in the first common path, the second transport vehicle 106b also halts simultaneously. The first and second transport vehicles 106a and 106b move in a leader-follower configuration until the first transport vehicle 106a crosses the fiducial marker $FM_7$, i.e., the end of the first common path. After the first transport vehicle 106a traverses the first common path and crosses the fiducial marker $FM_7$, the first and second transport vehicles 106a and 106b may break the leader-follower configuration.

After the first and second items are retrieved from the first PSU 202 at the first operator station 108a and the fourth and fifth items are placed in the first PSU 202 at the second operator station 108b, the first transport vehicle 106a transports the first PSU 202 back to the storage area 104. Likewise, the second transport vehicle 106b transports the second PSU back to the storage area 104 after the third item is retrieved from the second PSU at the first operator station 108a. Synchronous movement of the first and second transport vehicles 106a and 106b along the first common path is explained in detail in conjunction with FIG. 5.

It will be apparent to a person of skill in the art that the WCS 110 may identify PSUs and available transport vehicles such that a throughput for fulfilling the first and second requests is maximized. For example, the WCS 110 may identify a single PSU that is associated with the first through fifth items included in the first and second requests.

In one embodiment, the WCS 110 may divide the storage facility 102 into a virtual grid having various virtual cells based on the retrieved virtual map of the storage facility 102. The WCS 110 may utilize the virtual grid for determining optimal paths in the storage facility 102. In one embodiment, the WCS 110 may divide the storage facility 102 into multiple virtual grids bases on different configurations, dimensions, and sizes of the transport units 106 available in the storage facility 102. For example, when the sizes of the transport units 106 are different, the WCS 110 divides the storage facility 102 into three virtual grids (i.e., first through third virtual grids). The first virtual grid formed based on the size and dimensions of the first transport vehicle 106a may have virtual cells such that each virtual cell is associated with a single fiducial marker. The second virtual grid formed based on the size and dimensions of the second transport vehicle 106b may have virtual cells such that each virtual cell is associated with four fiducial markers. The third virtual grid formed based on the size and dimensions of the third transport vehicle 106c may have virtual cells such that each virtual cell is associated with sixteen fiducial markers. While determining an optimal path for a transport vehicle, the WCS 110 may utilize a corresponding virtual grid of the transport vehicle. The WCS 110 may further include a cell size of the first virtual grid in the first message communicated to the first transport vehicle 106a, thereby enabling the first transport vehicle 106a to traverse the first optimal path.

Figure 5:
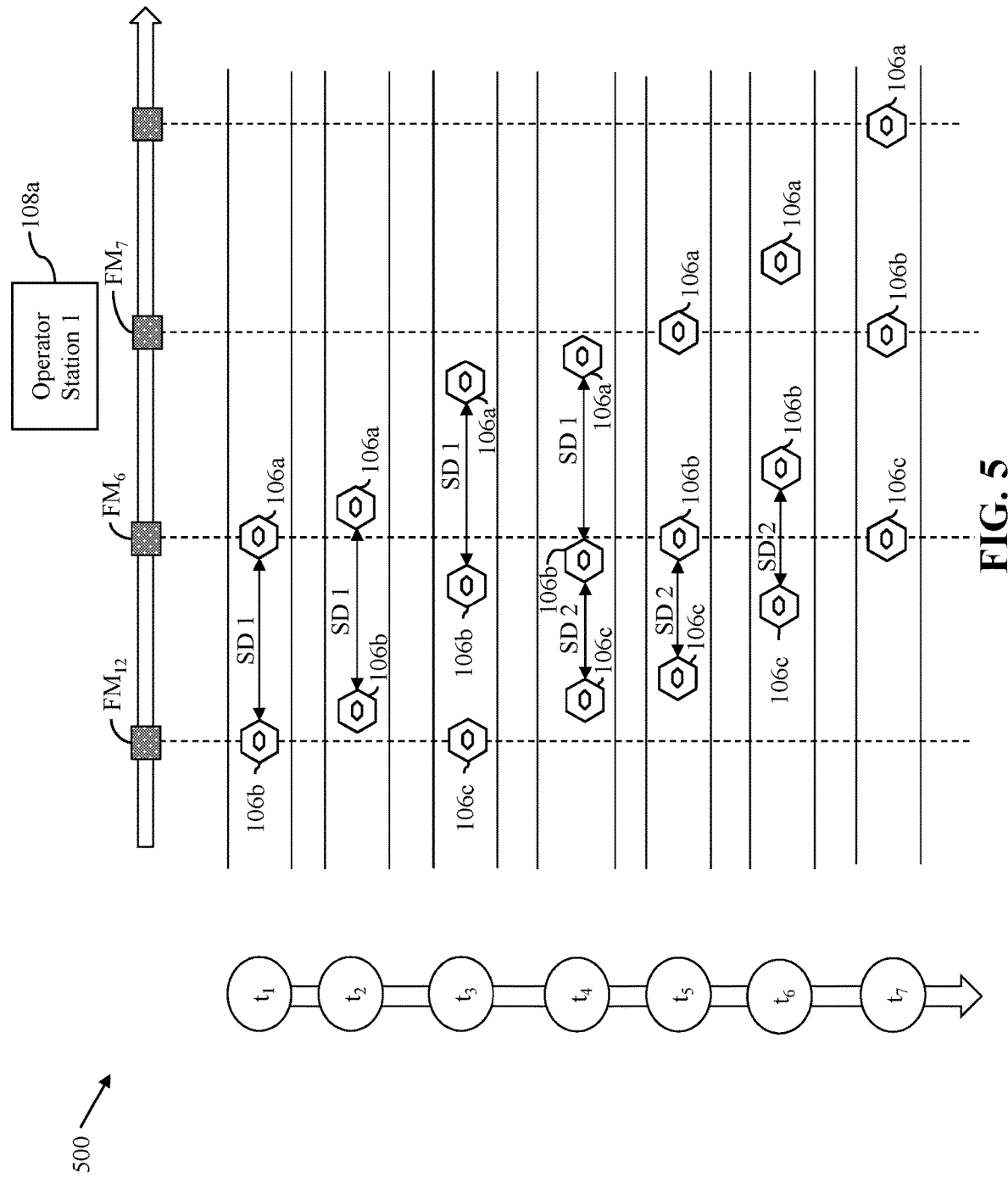
FIG. 5 is a block diagram of an exemplary scenario that describes a method for synchronizing movement of the first and second transport vehicles, in accordance with an embodiment of the present disclosure.

FIG. 5 is a block diagram of an exemplary scenario 500 that describes a method for synchronizing movement of the first and second transport vehicles 106a and 106b, in accordance with an embodiment of the present disclosure. The scenario 500 involves the first through third transport vehicles 106a-106c, the first operator station 108a, and the fiducial markers $FM_6$, $FM_7$, and $FM_{12}$.

At the time instant $t_1$, the first and second transport vehicles 106a and 106b are located at the fiducial markers $FM_6$ and $FM_{12}$, respectively, and the WCS 110 communicates the first and second SM messages to the first and second transport vehicles 106a and 106b, respectively. As described in the foregoing description of FIG. 4, the first and second transport vehicles 106a and 106b move synchronously in the 'leader-follower' configuration, based on the first and second SM messages. When the first and second transport vehicles 106a and 106b move synchronously in the 'leader-follower' configuration, the second transport vehicle 106b maintains the first safe distance (e.g., SD 1) from the first transport vehicle 106a to prevent collision therebetween.

At time instant $t_2$, the first transport vehicle 106a moves towards the fiducial marker $FM_7$ from the fiducial marker $FM_6$ and the second transport vehicle 106b follows the first transport vehicle 106a, maintaining the first safe distance (i.e., SD 1) therebetween. It will be apparent to those of skill in the art that the first safe distance may have any value without deviating from the scope of the invention. For example, the first safe distance may be less than or greater than the distance between two consecutive fiducial markers. In a scenario where the first safe distance is greater than the distance between consecutive fiducial markers, the second transport vehicle 106b may remain stationary at the fiducial maker $FM_{12}$ when the first transport vehicle 106a starts moving from the fiducial marker $FM_6$. The second transport vehicle 106b may begin to moving synchronously with the first transport vehicle 106a once a distance between the first and second transport vehicles 106a and 106b equals the first safe distance.

At time instant $t_3$, the first and second transport vehicles 106a and 106b are moving synchronously towards the fiducial markers $FM_7$ and $FM_6$, respectively. The second transport vehicle 106b follows the first transport vehicle 106a by maintaining the first safe distance (i.e., SD 1) therebetween. Further, a third transport vehicle 106c reaches the fiducial marker $FM_{12}$. The third transport vehicle 106c may be instructed by the WCS 110 to traverse a third optimal path. The third optimal path includes the fiducial markers $FM_{13}$, $FM_{14}$, $FM_{12}$, $FM_6$, and $FM_{15}$ (i.e., $FM_{12} \rightarrow FM_{14} \rightarrow FM_{11} \rightarrow FM_6 \rightarrow FM_{15}$) and overlaps (i.e., a second common path) with the second optimal path. For preventing the collision between the second and third transport vehicles 106b and 106c, the WCS 110 may have communicated a third SM message to the third transport vehicle 106c for instructing the third transport vehicle 106c to maintain a second safe distance (i.e., SD 2) from the second transport vehicle 106b while traversing the second common path. The WCS 110 may have determined the second safe distance (i.e., SD 2) in a manner similar to the determination of the first safe distance. As shown in FIG. 5, the second safe distance is less than the first safe distance (i.e., SD 2<SD 1). In other words, the second safe distance is less than the distance between two consecutive fiducial markers. As the second transport vehicle 106b is ahead of the third transport vehicle 106c on the second common path, the second and third transport vehicles 106b and 106c are designated as 'sub-leader' and 'sub-follower', respectively, by the WCS 110. For designating the second transport vehicle 106b as the 'sub-leader', the WCS 110 may have communicated a fourth SM message to the second transport vehicle 106b when the second transport vehicle 106b was at the fiducial marker $FM_{ii}$. Thus, based on the third and fourth SM messages, the second and third transport vehicles 106b and 106c move into a 'leader-follower' configuration. Thus, at the time instant $t_3$, the first transport vehicle 106a is the leader, the second transport vehicle 106b is the follower as well as the sub-leader, and the third transport vehicle 106c is the sub-follower. In other words, the second transport vehicle 106b follows the first transport vehicle 106a and the third transport vehicle 106c follows the second transport vehicle 106b.

At time instant $t_4$, the first and second transport vehicles 106a and 106b are still moving towards the fiducial markers $FM_7$ and $FM_6$, respectively. The second transport vehicle 106b follows the first transport vehicle 106a by maintaining the first safe distance (i.e., SD 1) therebetween. Further, the third transport vehicle 106c follows the second transport vehicle 106b by maintaining the second safe distance (i.e., SD 2) therebetween.

At time instant $t_5$, the first and second transport vehicles 106a and 106b reach the fiducial markers $FM_7$ and $FM_6$, respectively. The first transport vehicle 106a halts at the fiducial marker $FM_7$ and presents the first PSU 202 at the first operator station 108a for retrieval of the first and second items. Since the first transport vehicle 106a is halted, the second transport vehicle 106b also comes to a halt at the fiducial marker $FM_6$ for maintaining the first safe distance (i.e., SD 1) therebetween. Likewise, the third transport vehicle 106c also comes to a halt to maintain the second safe distance (i.e., SD 2) from the second transport vehicle 106b.

At time instant $t_6$, the first transport vehicle 106a moves towards the fiducial marker $FM_9$ as the first and second items are successfully retrieved from the first PSU 202. The first and second transport vehicles 106a and 106b no longer move in the leader-follower configuration as the first transport vehicle 106a has crossed the first common path. However, at time instant $t_6$, the second and third transport vehicles 106b and 106c are in the leader-follower configuration and are moving synchronously.

At time instant $t_7$, the second and third transport vehicles 106b and 106c are in the leader-follower configuration and the second transport vehicle 106b has reached the fiducial marker $FM_7$. The second transport vehicle 106b halts at the fiducial marker $FM_7$ and presents the second PSU at the first operator station 108a for retrieval of the third item. Since the second transport vehicle 106b is halted, the third transport vehicle 106c also comes to a halt for maintaining the second safe distance (i.e., SD 2) therebetween.

After the third item is retrieved from the second PSU, the second transport vehicle 106b may return the second PSU to the storage area 104. In one embodiment, the second transport vehicle 106b may retrace the second optimal path in an opposite direction or take another path, based on the commands received from the WCS 110 for returning the second PSU to the storage area 104. Similarly, after the fourth and fifth items are placed in the first PSU 202 at the second operator station 108b, the first transport vehicle 106a may return the first PSU 202 to the storage area 104.

In some scenarios, a second navigation unit of the second transport vehicle 106b may malfunction while the first and second transport vehicles 106a and 106b are traversing the first common path. The malfunction may be caused due to a reset of the second navigation unit, a shutdown of the second navigation unit, or the like. The malfunction may cause the second navigation unit to stop functioning. In a such a scenario, the second transport vehicle 106b may be required to be halted for avoiding a collision with the first transport vehicle 106a. For preemptively tackling such situations involving malfunctions, in some embodiments, the WCS 110 determines a first timer value for a second watchdog module of the second transport vehicle 106b and communicates the first timer value to the second transport vehicle 106b as a part of the second SM message. The WCS 110 may determine the first timer value based on the first set of factors as described in the foregoing. Thus, in a scenario where the second navigation unit malfunctions, the second watchdog module is triggered based on the first timer value to bring the second transport vehicle 106b to a halt before the second transport vehicle 106b collides with the first transport vehicle 106a.

In another embodiment, a PSU may need to be transported to an operator station (e.g., the first operator station 108a) for fulfilment of a third request received by the WCS 110. In one scenario, the PSU may be too large or too heavy to be transported by a single transport vehicle 106. In such a scenario, the WCS 110 may instruct multiple transport vehicles of the transport vehicles 106 to transport the PSU. For example, the WCS 110 may instruct the first through third transport vehicles 106a-106c to transport the PSU to the first operator station 108a. The WCS 110 may determine a fourth optimal path from a location of the PSU to the first operator station 108a. In such a scenario, the entire fourth optimal path is a common path. The WCS 110 may communicate SM messages to the first through third transport vehicles 106a-106c, such that the first through third transport vehicles 106a-106c move synchronously in a leader-follower configuration along the fourth optimal path, transporting the PSU. In this scenario, a relative position of each transport vehicle is fixed with respect to the other two transport vehicles. For example, a relative position of the first transport vehicle 106a is fixed with respect to the second and third transport vehicles 106b and 106c, when the first through third transport vehicles 106a-106c traverse the fourth optimal path for transporting the PSU.

Figure 6:
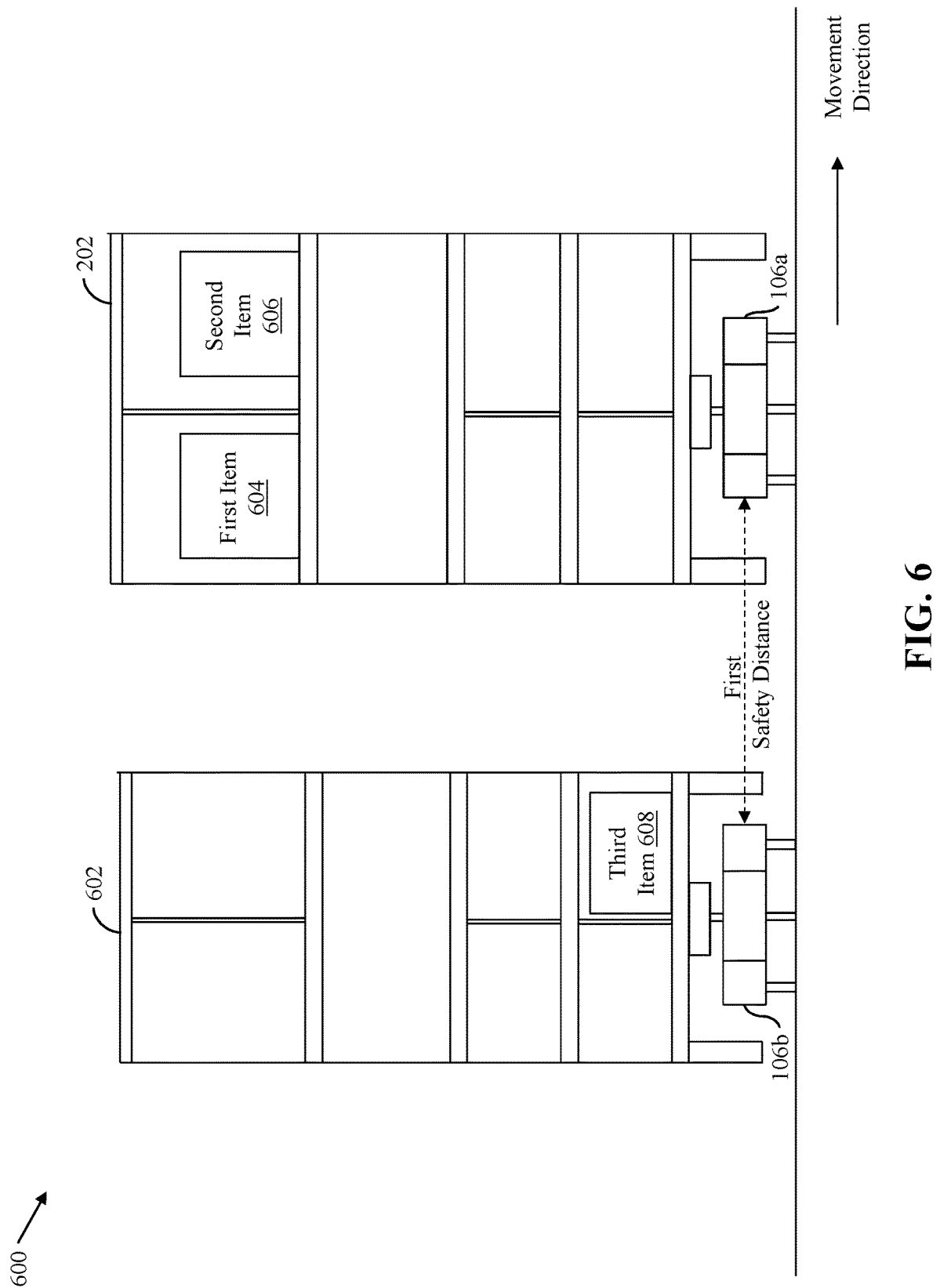
FIG. 6 is a block diagram of an exemplary scenario that illustrates the first and second transport vehicles moving in leader-follower configuration, in accordance with an embodiment of the present disclosure.

FIG. 6 is a block diagram of an exemplary scenario 600 that illustrates the first and second transport vehicles 106a and 106b moving in leader-follower configuration, in accordance with an embodiment of the present disclosure. The scenario 600 involves the first and second transport vehicles 106a and 106b, the first PSU 202, and the second PSU (hereinafter, the second PSU is referred to and designated as 'second PSU 602').

The first and second transport vehicles 106a and 106b are carrying the first and second PSUs (202 and 602, respectively) and moving synchronously in the leader-follower configuration along the first common path (as described in the foregoing description of FIG. 4). The first PSU 202 stores the first and second items (hereinafter, the first and second items are referred to and designated as the 'first and second items 604 and 606'), respectively. The second PSU 602 stores the third item (hereinafter, the third item is referred to and designated as the 'third item 608'). To avoid collision, the second transport vehicle 106b maintains a distance equal to the first safe distance (i.e., SD 1) from the first transport vehicle 106a. The first safe distance is determined based on the first set of factors (as described in the foregoing description of FIG. 4).

Figure 7:
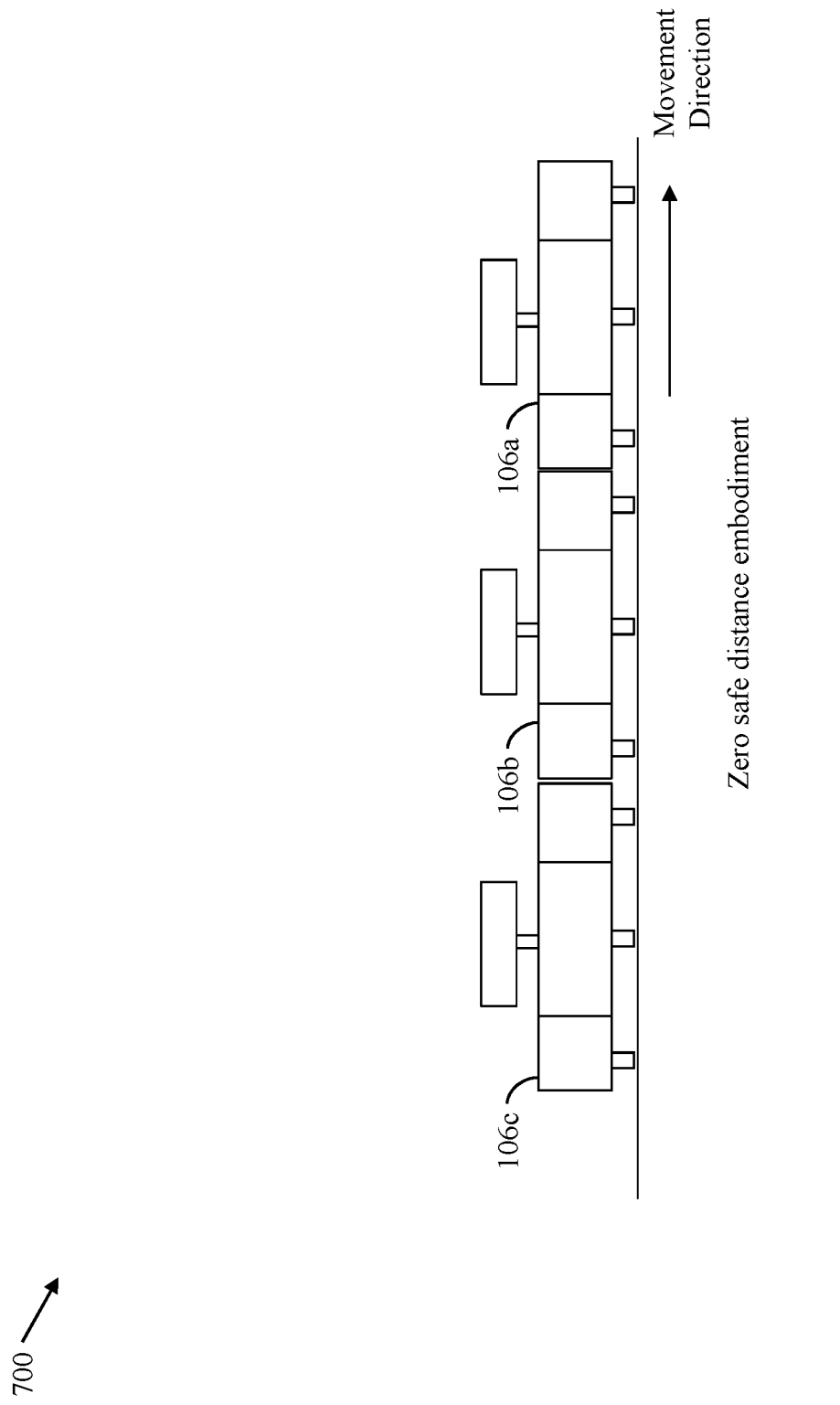
FIG. 7 is a block diagram of another exemplary scenario that illustrates the first and second transport vehicles and a third transport vehicles of FIG. 1 moving in leader-follower configuration, in accordance with another embodiment of the present disclosure.

FIG. 7 is a block diagram of another exemplary scenario 700 that illustrates the first through third transport vehicles 106a-106c moving in leader-follower configuration, in accordance with an embodiment of the present disclosure. The first through third transport vehicles 106a-106c are moving synchronously in a leader-follower configuration along a common path, such that a safe distance therebetween tends to zero.

FIG. 8 is a block diagram that illustrates the WCS 110, in accordance with an embodiment of the present disclosure. The WCS 110 includes a processor 802, a database 804, and a transceiver 806 that communicate with each other by way of a first communication bus 808. The processor 802 includes an inventory manager 810, a request handler 812, a layout manager 814, a route identifier 816, and an allocation manager 818 that communicate with each other by way of a second communication bus 820. It will be apparent to a person having ordinary skill in the art that the WCS 110 is for illustrative purposes and not limited to any specific combination or hardware circuitry and/or software.

The processor 802 includes suitable logic, instructions, circuitry, interfaces, and/or codes for executing various operations, such as inventory or warehouse management operations, procurement operations, or the like. Examples of the processor 802 include, but are not limited to, an application-specific integrated circuit (ASIC) processor, a reduced instruction set computing (RISC) processor, a complex instruction set computing (CISC) processor, a field-programmable gate array (FPGA), and the like. The processor 802 performs the inventory management operations, such as identifying the optimal paths and determining common paths (as described in the foregoing descriptions of FIGS. 4 and 5), to facilitate retrieval inventory items from the PSUs and placement of inventory items in the PSUs.

The database 804 includes suitable logic, instructions, circuitry, interfaces, and/or codes to store an inventory list 822, layout information 824, inventory storage data 826, and transport vehicle data 828. Examples of the database 804 include a random-access memory (RAM), a read-only memory (ROM), a removable storage drive, a hard disk drive (HDD), a flash memory, a solid-state memory, and the like. In one embodiment, the database 804 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the invention is not limited to realizing the database 804 in the WCS 110, as described herein. In other embodiments, the database 804 may be realized in form of an external database server or a cloud storage working in conjunction with the WCS 110, without departing from the scope of the invention.

The inventory list 822 includes a list of inventory items stored in the storage facility 102 and a number of units of each inventory item stored in the storage facility 102. The layout information 824 includes the virtual map of the storage facility 102. The virtual map may include information pertaining to the layout of the storage facility 102, such as the locations of the fiducial markers. The layout information 824 further includes an association between the fiducial markers and the ISUs 114 and the PSUs (e.g., the first and second PSUs 202 and 602) that constitute the ISUs 114. The layout information 824 indicates real time locations of the ISUs 114 and/or PSUs based on the storage unit markers. The layout information 824 further includes real-time path availability information of various paths in the storage facility 102. For example, the layout information 824 may indicate that one or more paths (such as the aisles 116) are closed down for maintenance.

The inventory storage data 826 is indicative of the associations between the inventory items and the PSUs. The inventory storage data 826 includes details of the inventory items stored in each PSU of the ISUs 114. As described in the foregoing, each PSU or ISU 114 may be associated with a storage unit marker. Based on the inventory storage data 826, the WCS 110 is aware of the storage locations of the inventory items stored in the PSUs and the ISUs 114. The transport vehicle data 828 is indicative of details of the first through third transport vehicles 106a-106c present in the storage facility 102. The details of each of the first through third transport vehicles 106a-106c may include a size, dimensions, a payload capacity, a maximum and minimum speed of the transport vehicle, or the like. The details may further include an identifier (such as a numeric or an alpha-numeric code) associated with the transport vehicle, real-time information such as a real-time location, an indicator that indicates whether the transport vehicle is carrying a payload, a weight of the payload, or the like. The transport vehicle data 828 may also indicate whether any of the transport vehicles 106 are moving synchronously in a leader-follower configuration.

The transceiver 806 transmits and receives data over the communication network 112 using one or more communication network protocols. The transceiver 806 transmits various requests and messages to the transport vehicles 106 and the operator stations 108 and receives requests and messages from the transport vehicles 106 and the operator stations 108. Examples of the transceiver 806 include, but are not limited to, an antenna, a radio frequency transceiver, a wireless transceiver, a Bluetooth transceiver, an ethernet based transceiver, a universal serial bus (USB) transceiver, or any other device configured to transmit and receive data.

The processor 802 performs the inventory or warehouse management operations by way of the inventory manager 810, the request handler 812, the layout manager 814, the route identifier 816, and the allocation manager 818. The inventory manager 810 manages the inventory list 822 stored in the database 804. For example, the inventory manager 810 adds new inventory items to the inventory list 822 when the new inventory items are stored in the storage area 104 and updates the inventory list 822 whenever there is any change in regards to the inventory items stored in the storage area 104 (e.g., when items are retrieved from PSU for fulfilment of orders).

The request handler 812 processes all the requests received from the external communication server. The request handler 812 identifies, based on the requests (such as the first and second requests) received from the external communication server, inventory items pertinent to the requests. The request handler 812 further identifies the PSUs that store the inventory items associated with the requests. The request handler 812 may further communicate, for fulfilment of the requests, details regarding the inventory items to the operator stations 108. In one embodiment, when the storage facility 102 does not have all inventory items specified in a request, the request handler 812 may queue the request for a specific-time interval until the storage facility 102 receives all the inventory items specified in the request. In one embodiment, the request handler 812 merges various requests (such as the first and second requests) to optimize fulfilment of the requests.

The layout manager 814 manages the layout information 824. For example, if there is any change in the layout of the storage facility 102 (such as a change in the arrangement of the ISUs 114 or the PSUs), the layout manager 814 updates the layout information 824 based on the change in the layout. The route identifier 816 is responsible for determining the optimal paths (such as the first, second, and third optimal paths). The route identifier 816, further identifies common paths (such as the first and second common paths) based on overlaps between the optimal paths. The route identifier 816 further determines likelihood of collisions between the transport vehicles 106 on the common paths. Based on the determination of the likelihood of collisions, the route identifier 816 identifies alternative paths and performs cost-benefit analyses (as described in the foregoing descriptions of FIGS. 4 and 5). Further, the route identifier 816 determines safe distances (such as the first and second safe distances) to be maintained by the transport vehicles 106, therebetween, while traversing the common paths. Thus, the route identifier 816 performs all operations involved in the determination of the optimal paths and the safe distances. The allocation manager 818 handles the allocation of the transport vehicles 106 to the payloads (such as the first and second payloads). For example, the allocation manager 818 determines that the first transport vehicle 106a is available to transport the first PSU 202 and, thus, allocates the first transport vehicle 106a to the first PSU 202.

Though, the processor 802 is depicted as a hardware component in FIG. 8, a person skilled in the art will appreciate that the scope of the invention is not limited to realizing the processor 802 as the hardware component. In another embodiment, the functionality of the processor 802 may be implemented by way of a computer executable code or a set of computer readable instructions stored in the database 804, without deviating from the spirit of the invention.

Figure 9:
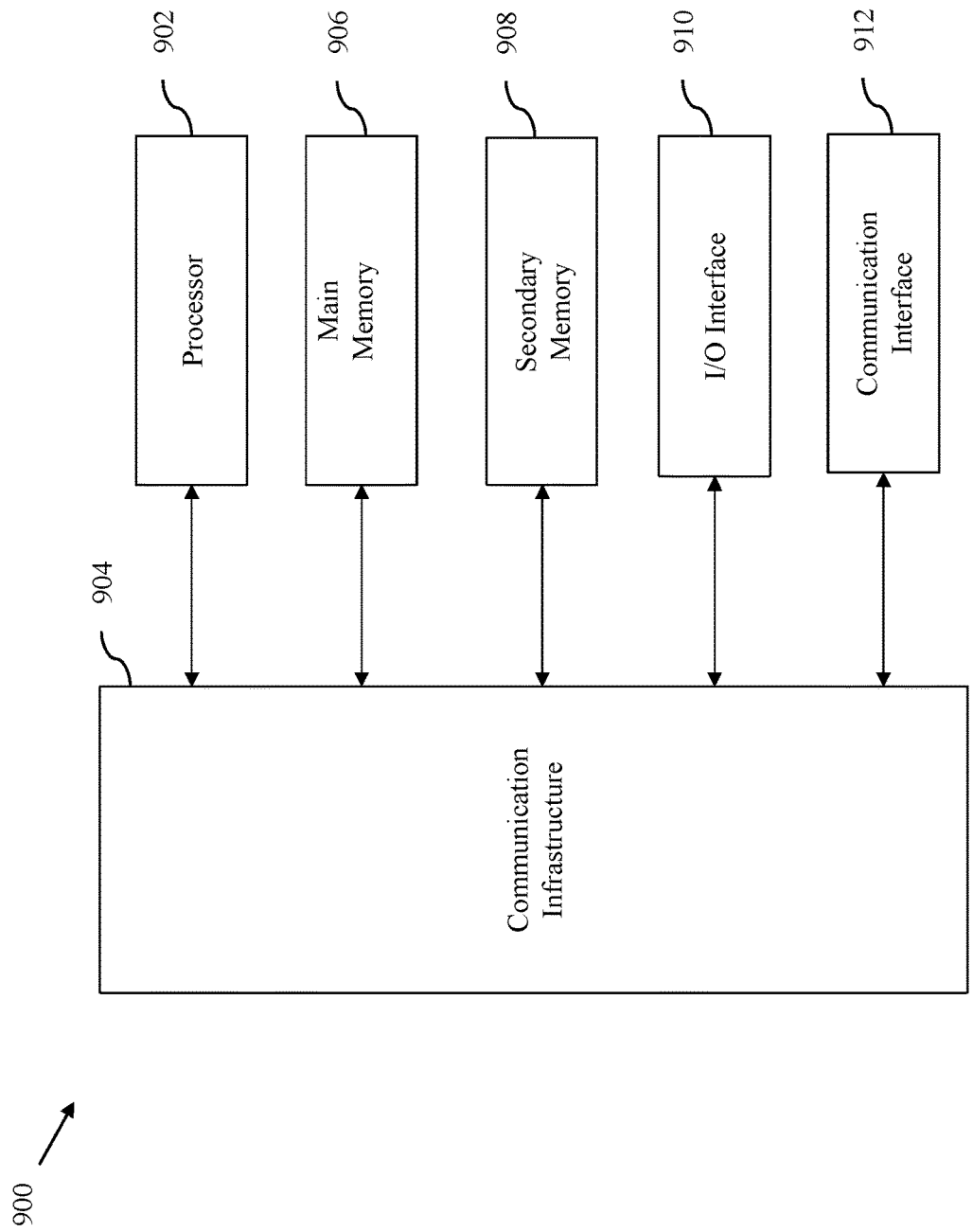
FIG. 9 is a block diagram that illustrates system architecture of a computer system, in accordance with an embodiment of the present disclosure.

FIG. 9 is a block diagram that illustrates system architecture of a computer system 900, in accordance with an embodiment of the present disclosure. An embodiment of present disclosure, or portions thereof, may be implemented as computer readable code on the computer system 900. In one example, the transport vehicles 106 and the operator stations 108 may be implemented in the computer system 900. Hardware, software, or any combination thereof may embody modules and components used to implement methods of FIGS. 10A-10C. The computer system 900 includes a processor 902 that may be connected to a communication infrastructure 904. The computer system 900 may further include a main memory 906 and a secondary memory 908. The computer system 900 further includes an input/output (I/O) interface 910 and a communication interface 912. The communication interface 912 may allow data transfer between the computer system 900 and various devices that are communicatively coupled to the computer system 900.

Figure 10A:
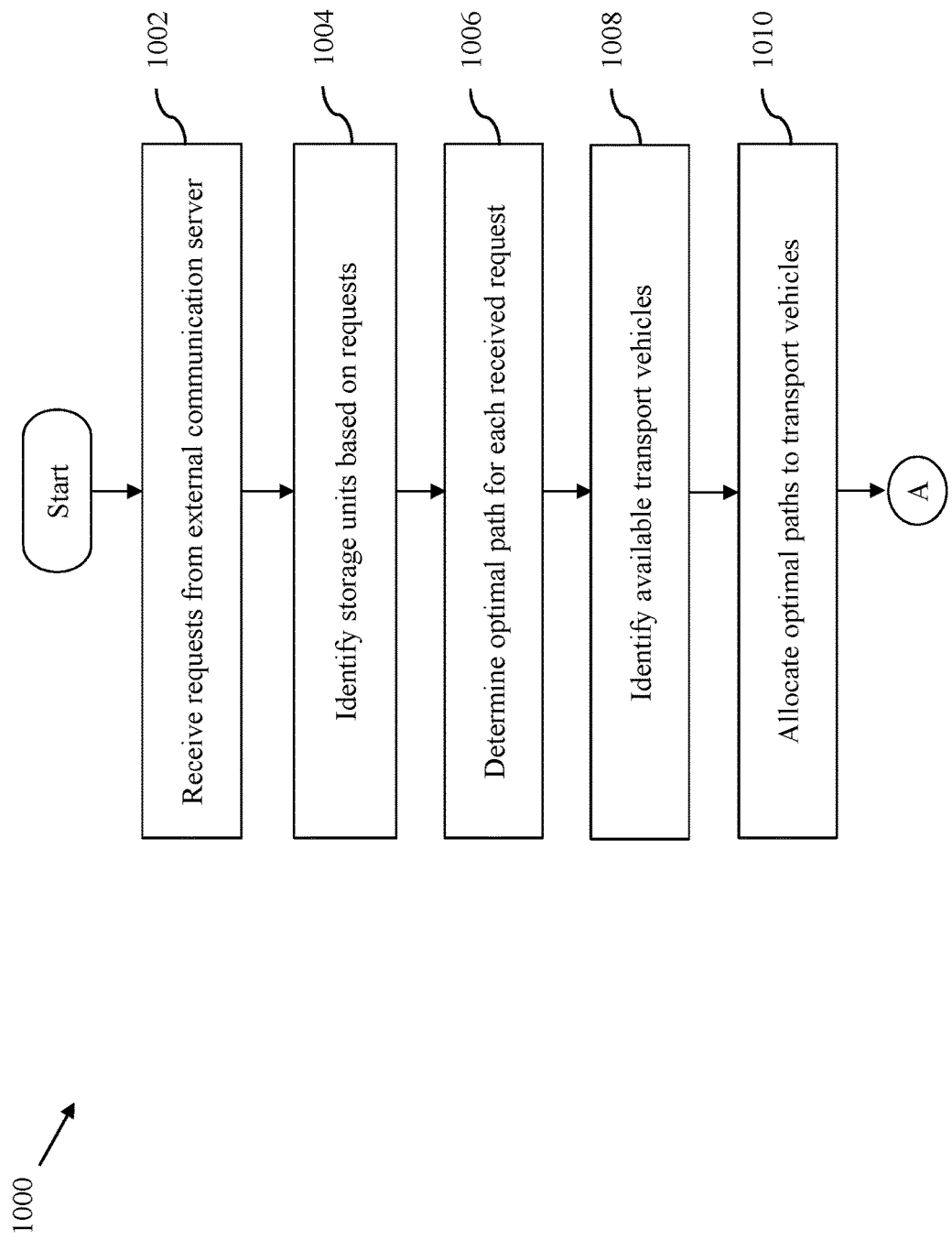
FIGS. 10A-10C, collectively represent a flow chart that illustrates a process for synchronizing movement of the first and second transport vehicles in a storage facility of FIG. 1, in accordance with an embodiment of the present disclosure.
Figure 10B:
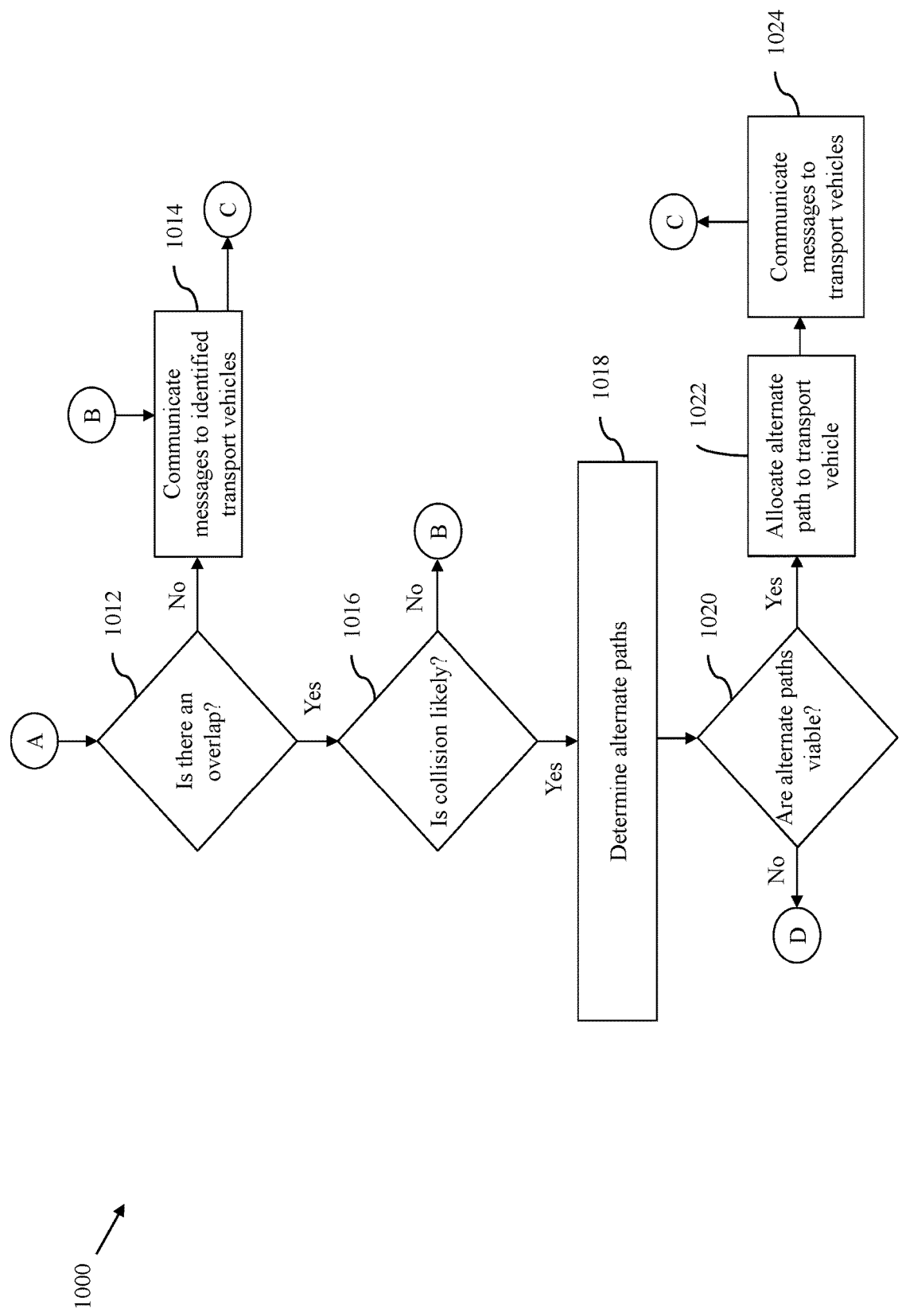
Figure 10C:
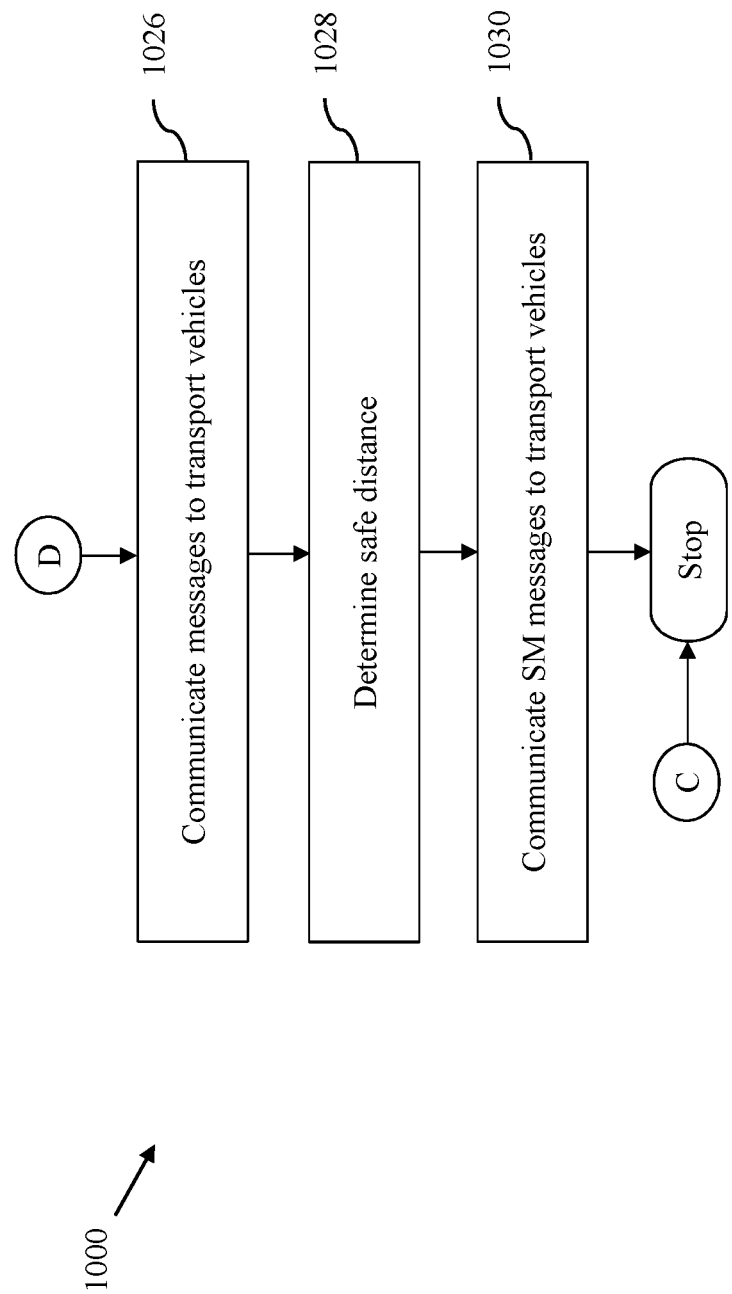

FIGS. 10A-10C, collectively represent a flow chart 1000 that illustrates process for synchronizing movement of the first and second transport vehicles 106a and 106b in the storage facility 102, in accordance with an embodiment of the present disclosure. In some embodiments, the process is performed by the WCS 110. FIG. 10 is explained in conjunction with FIGS. 4 and 5.

The process may generally start at step 1002, where the WCS 110 receives requests (e.g., the first and second requests) from the external communication server. The process proceeds to step 1004, where the WCS 110 identifies storage units (e.g., the first and second PSUs 202 and 602) based on the received requests. The WCS 110 identifies (e.g., the first through fifth items) inventory items pertaining to the received requests. Based on the inventory storage data 826, the WCS 110 identifies PSUs (e.g., the first and second PSUs 202 and 602) that are allocated to the inventory items of the first and second requests. The process proceeds to step 1006, where the WCS 110 determines the first and second optimal paths to be traversed by transport vehicles for transporting the first and second PSUs 202 and 602 to the operator stations 108, respectively. The process proceeds to step 1008, where the WCS 110 identifies transport vehicles (e.g., the first and second transport vehicles 106a and 106b)

that are available for transporting the first and second PSUs 202 and 602 from the storage area 104 to the operator stations 108. The process proceeds to step 1010, where the WCS 110 allocates the first and second optimal paths to the first and second transport vehicles 106a and 106b, respectively. For example, the WCS 110 determines that the first and second transport vehicles 106 and 106b are to traverse the first and second optimal paths for transporting the first and second PSUs 202 and 602 to the operating stations 108.

The process proceeds to step 1012, where the WCS 110 determines whether there is an overlap between the determined optimal paths such as the first and second optimal paths. If at step 1012, it is determined that there is no overlap between the determined optimal paths, the process proceeds to step 1014. At step 1014, the WCS 110 communicates messages to the identified available transport vehicles (e.g., the first and second messages are communicated to the first and second transport vehicles 106a and 106b, respectively). The first and second messages are indicative of the first and second optimal paths to be traversed by the first and second transport vehicles 106a and 106b, respectively. If at step 1012, it is determined that there is an overlap between the determined optimal paths (e.g., first and second optimal paths), the process proceeds to step 1016.

At step 1016, the WCS 110 determines whether a collision between the identified available transport vehicles (e.g. first and second transport vehicles 106a and 106b) is likely, when the identified available transport vehicles traverse a common path (e.g., the first common path) that corresponds to the overlap between the determined optimal paths (e.g., first and second optimal paths). If at step 1016, it is determined that the collision is not likely, the process proceeds to step 1014. If at step 1016, it is determined that the collision is likely, the process proceeds to step 1018. At step 1018, the WCS 110 determines alternate paths that may be traversed by one of the identified available transport vehicles (e.g., the first and second transport vehicles 106a and 106b) for avoiding the collision. The process proceeds to step 1020, where the WCS 110 determines if any of the alternate paths are viable. If at step 1020, it is determined that at least one alternate path is viable, the process proceeds to step 1022. At step 1022, the WCS 110 allocates an alternate path to one of the identified available transport vehicles (e.g., the first and second transport vehicles 106a and 106b). For example, the WCS 110 allocates a first alternate path to the second transport vehicle 106b. The process proceeds to step 1024, where the WCS 110 communicates messages to the identified available transport vehicles (e.g., the first and second messages to the first and second transport vehicles 106a and 106b, respectively). For example, the WCS 110 may communicate the first and second messages that are indicative of the first optimal path and the first alternate path to be traversed by the first and second transport vehicles 106a and 106b, respectively.

If at step 1020, it is determined that the alternate paths are not viable, the process proceeds to step 1026. At step 1026, the WCS 110 communicates the first and second messages to the first and second transport vehicles 106a and 106b, respectively. The process proceeds to step 1028, where the WCS 100 determines a safe distance (e.g., the first safe distance) to be maintained between the identified available transport vehicles (e.g. the first and second transport vehicles 106a and 106b), when the traverse the common path. The process proceeds to step 1030, where the WCS 110 communicates SM messages (e.g., the first and second SM messages) to the identified available transport vehicles (e.g., the first and second transport vehicles 106a and 106b), when one of the identified available transport vehicles reaches a starting point of the common path. The SM messages are indicative of the first safe distance. The SM messages are for synchronizing the movement of the identified available transport vehicles (e.g., the first and second transport vehicles 106a and 106b) when the identified available transport vehicles traverse the common path in the same direction.

The WCS 110 facilitates synchronization of movement of the transport vehicles 106, for avoiding collisions therebetween, (e.g., the first and second transport vehicles 106a and 106b) when the transport vehicles 106 traverse common paths (e.g., the first common path). By facilitating synchronous movement of the transport vehicles 106 along the common paths, the WCS 110 enables the transport vehicles 106 to carry the PSUs (e.g., the first and second PSUs 202 and 602) to the operation stations 108 in short durations of time. Consequently, a throughput and/or an efficiency of the inventory management operations at the storage facility 102 is increased. In other words, technological improvements in the WCS 110 enables the WCS 110 to increase the throughput of the inventory management operations while simultaneously preventing collisions among the transport vehicles 106. For implementing the synchronize-movement method, no infrastructural upgrade is required to the existing systems. Thus, the synchronize-movement method is flexible and scalable and may be implemented in any storage facility that employs transport vehicles. Further, for implementing the synchronize-movement method, inter-vehicle communication is not required, i.e., the transport vehicles 106 are not required to communicate with each other. Therefore, there are no communication overheads between the transport vehicles 106. This results in reduced complexity and increased reliability of the transport vehicles 106. The WCS 110 accounts for failures of navigation units (e.g., first and second navigation units) of the transport vehicles 106 and communicates the timer values for watchdog modules to the transport vehicles 106 (as described in the foregoing descriptions of FIGS. 3 and 5). Therefore, no compromise is made in regards to safety of the transport vehicles 106 or the PSUs.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for synchronizing movement of transport vehicles in a storage facility. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for synchronizing movement of transport vehicles in a storage facility, the method comprising:
    determining, by a server that is in communication with first and second transport vehicles over a network in accordance with a wireless communication protocol, first and second paths to be traversed by the first and second transport vehicles, respectively, in the storage facility, the first and second paths including a plurality of fiducial markers for facilitating movement of the first and second transport vehicles along the first and second paths, respectively;
    identifying, by the server, a common path to be traversed by the first and second transport vehicles in a same direction, the common path corresponding to an overlap between the first and second paths, the common path including a subset of fiducial markers of the plurality of fiducial markers;
    determining, by the server, a first safe distance to be maintained between the first and second transport vehicles in response to a determination that the first transport vehicle reaches a first fiducial marker of the subset of fiducial markers corresponding to a starting point of the common path; and
    transmitting, by the server to communication circuitry of the second transport vehicle over the network in accordance with the wireless communication protocol in response to the determination that the first transport vehicle reaches the first fiducial marker, a first message for synchronizing movement of the first and second transport vehicles on the common path along the subset of fiducial markers, wherein the first message includes information that is indicative of the first safe distance, and wherein the second transport vehicle follows the first transport vehicle along the common path based on the first message and maintains a distance greater than or equal to the first safe distance from the first transport vehicle.

2. The method of claim 1, wherein the first and second transport vehicles are in a leader-follower configuration when the first and second transport vehicles traverse the common path.

3. The method of claim 2, wherein the second transport vehicle is designated as a follower based on the first message.

4. The method of claim 3, further comprising transmitting, by the server over the network in accordance with the wireless communication protocol to communication circuitry of the first transport vehicle, a second message to the first transport vehicle, wherein the first transport vehicle is designated as a leader based on the second message.

5. The method of claim 1, wherein the first safe distance is determined by the server based on first and second dimensions of the first and second transport vehicles, respectively.

6. The method of claim 1, wherein the first safe distance is determined by the server based on first and second dimensions of first and second payloads carried by the first and second transport vehicles, respectively.

7. The method of claim 1, wherein the first safe distance is determined by the server based on first and second velocities of the first and second transport vehicles, respectively.

8. The method of claim 1, further comprising transmitting, by the server over the network in accordance with the wireless communication protocol to communication circuitry of the first transport vehicle and the communication circuitry of the second transport vehicle, first and second move instructions to the first and second transport vehicles, respectively, wherein the first and second move instructions include information of the first and second paths, respectively, and wherein the first and second transport vehicles traverse the first and second paths based on the first and second move instructions, respectively.

9. The method of claim 1, further comprising:
    determining, by the server, a second safe distance to be maintained between a third transport vehicle and the second transport vehicle for avoiding collision therebetween, when the second and third transport vehicles traverse the common path; and
    transmitting, by the server to communication circuitry of the third transport vehicle over the network in accordance with the wireless communication protocol, a second message for synchronizing movement of the second and third transport vehicles on the common path, wherein the second message is indicative of the second safe distance, and wherein the third transport vehicle follows the second transport vehicle along the common path based on the second message and maintains a distance greater than or equal to the second safe distance from the second transport vehicle.

10. A system for synchronizing movement of transport vehicles in a storage facility, the system comprising:
    a server in communication with first and second transport vehicles over a network in accordance with a wireless communication protocol, wherein the server is configured to:
        determine first and second paths to be traversed by the first and second transport vehicles, respectively, in the storage facility, the first and second paths including a plurality of fiducial markers for facilitating movement of the first and second transport vehicles along the first and second paths, respectively,
        identify a common path to be traversed by the first and second transport vehicles in a same direction, the common path corresponding to an overlap between the first and second paths, the common path including a subset of fiducial markers of the plurality of fiducial markers,
        determine a first safe distance to be maintained between the first and second transport vehicles in response to a determination that the first transport vehicle reaches a first fiducial marker of the subset of fiducial markers corresponding to a starting point of the common path, and
        transmit, to communication circuitry of the second transport vehicle over the network in accordance with the wireless communication protocol in response to the determination that the first transport vehicle reaches the first fiducial marker, a first message for synchronizing movement of the first and second transport vehicles on the common path along the subset of fiducial markers, wherein the first message is indicative of the first safe distance, and wherein the second transport vehicle follows the first transport vehicle along the common path based on the first message and maintains a distance greater than or equal to the first safe distance from the first transport vehicle.

11. The system of claim 10, wherein the first and second transport vehicles are in a leader-follower configuration when the first and second transport vehicles traverse the common path.

12. The system of claim 11, wherein the second transport vehicle is designated as a follower based on the first message.

13. The system of claim 12, wherein the server is further configured to transmit, over the network in accordance with the wireless communication protocol, a second message to communication circuitry of the first transport vehicle, and wherein the first transport vehicle is designated as a leader based on the second message.

14. The system of claim 10, wherein the server determines the first safe distance based on first and second dimensions of the first and second transport vehicles, respectively.

15. The system of claim 10, wherein the server determines the first safe distance based on first and second dimensions of first and second payloads carried by the first and second transport vehicles, respectively.

16. The system of claim 10, wherein the server determines the first safe distance based on first and second velocities of the first and second transport vehicles, respectively.

17. The system of claim 10, wherein the server is further configured to transmit, over the network in accordance with the wireless communication protocol to communication circuitry of the first transport vehicle and the communication circuitry of the second transport vehicle, first and second move instructions to the first and second transport vehicles, respectively, wherein the first and second move instructions include information of the first and second paths, respectively, and wherein the first and second transport vehicles traverse the first and second paths based on the first and second move instructions, respectively.

18. The system of claim 10, wherein the server is further configured to:
    determine a second safe distance to be maintained between a third transport vehicle and the second transport vehicle for avoiding collision therebetween, when the second and third transport vehicles traverse the common path, and
    transmit, over the network in accordance with the wireless communication protocol to communication circuitry of the third transport vehicle, a second message to the third transport vehicle for synchronizing movement of the second and third transport vehicles on the common path, wherein the second message is indicative of the second safe distance, and wherein the third transport vehicle follows the second transport vehicle along the common path based on the second message and maintains a distance greater than or equal to the second safe distance from the second transport vehicle.

* * * * *